US011531144B2

(12) United States Patent
Arima et al.

(10) Patent No.: US 11,531,144 B2
(45) Date of Patent: Dec. 20, 2022

(54) OPTICAL BODY, DIFFUSER PLATE, DISPLAY DEVICE, PROJECTION DEVICE, AND LIGHTING DEVICE

(71) Applicant: DEXERIALS CORPORATION, Tokyo (JP)

(72) Inventors: Mitsuo Arima, Tokyo (JP); Masayuki Ishiwata, Tokyo (JP); Tsutomu Nagahama, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 619 days.

(21) Appl. No.: 16/472,675

(22) PCT Filed: Dec. 5, 2017

(86) PCT No.: PCT/JP2017/043625
§ 371 (c)(1),
(2) Date: Jun. 21, 2019

(87) PCT Pub. No.: WO2018/123466
PCT Pub. Date: Jul. 5, 2018

(65) Prior Publication Data
US 2019/0369297 A1 Dec. 5, 2019

(30) Foreign Application Priority Data
Dec. 28, 2016 (JP) .............................. JP2016-256465

(51) Int. Cl.
*G02B 3/00* (2006.01)
*G03B 21/20* (2006.01)
(Continued)

(52) U.S. Cl.
CPC .............. *G02B 3/0043* (2013.01); *F21V 3/00* (2013.01); *G02B 5/0221* (2013.01); *G03B 21/208* (2013.01)

(58) Field of Classification Search
CPC .. G02B 3/0043; G02B 3/0056; G02B 5/0221; G03B 21/208
See application file for complete search history.

(56) References Cited

U.S. PATENT DOCUMENTS

2015/0293271 A1 10/2015 Miyasaka et al.

FOREIGN PATENT DOCUMENTS

JP 2005-275000 A 10/2005
JP 2012-013748 A 1/2012
(Continued)

OTHER PUBLICATIONS

Jul. 13, 2020, European Search Report issued for related EP application No. 17889349.1.
(Continued)

*Primary Examiner* — Ryan D Howard
(74) *Attorney, Agent, or Firm* — Paratus Law Group, PLLC

(57) ABSTRACT

To suppress, in an optical body in which a microlens array as a non-periodic structure is arranged and deployed in a wide range, occurrence of periodic optical properties in a structural unit larger than the non-periodic structure. The optical body includes a single non-periodic structure region or a collection of a plurality of non-periodic structure regions, the non-periodic structure region being composed of a single lens group including a plurality of single lenses. In the non-periodic structure region, a located state of the single lens group is non-periodic as a whole. A ratio of a size of the non-periodic structure region to an average aperture diameter of the single lenses in the non-periodic structure region is more than or equal to 25.

11 Claims, 21 Drawing Sheets

(51) Int. Cl.
F21V 3/00 (2015.01)
G02B 5/02 (2006.01)

(56) References Cited

FOREIGN PATENT DOCUMENTS

| JP | 2013-076881 A | 4/2013 |
| JP | 2013-114010 A | 6/2013 |
| WO | WO 2016/052359 A1 | 4/2016 |
| WO | WO 2016/143350 A1 | 9/2016 |

OTHER PUBLICATIONS

Jul. 16, 2021, Chinese Office Action issued for related CN application No. 201780081201.0.
Mar. 22, 2021, European Communication issued for related EP application No. 17889349.1.
May 25, 2021, Japanese Office Action issued for related JP application No. 2016-256465.
Sep. 24, 2020, Chinese Office Action issued for related CN Application No. 201780081201.0.
Nov. 4, 2020, Japanese Office Action issued for related JP Application No. 2016-256465.
Mar. 8, 2022, Chinese Office Action issued for related CN Application No. 201780081201.0.
Aug. 16, 2022, Japanese Office Action issued for related JP Application No. 2021-136964.

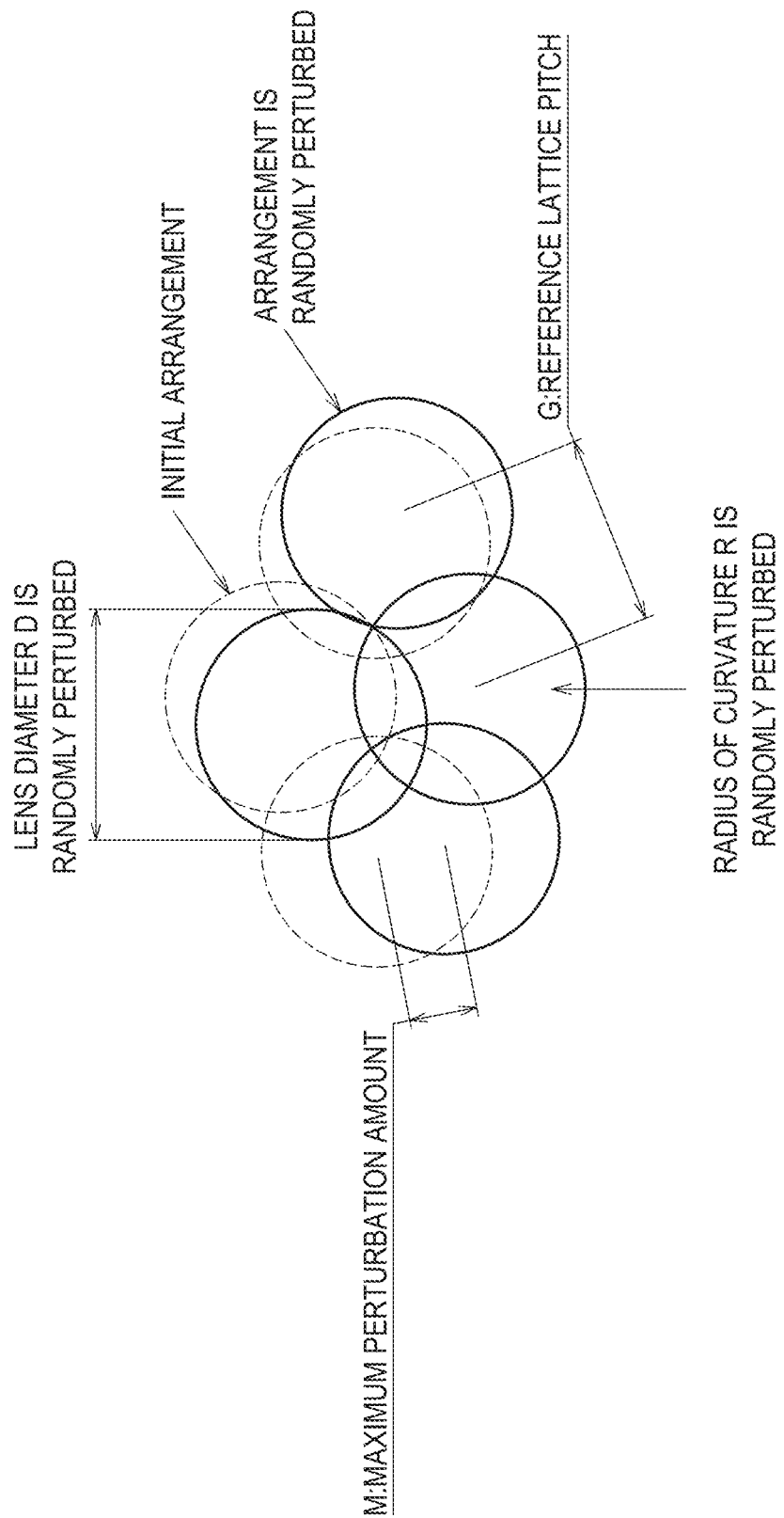

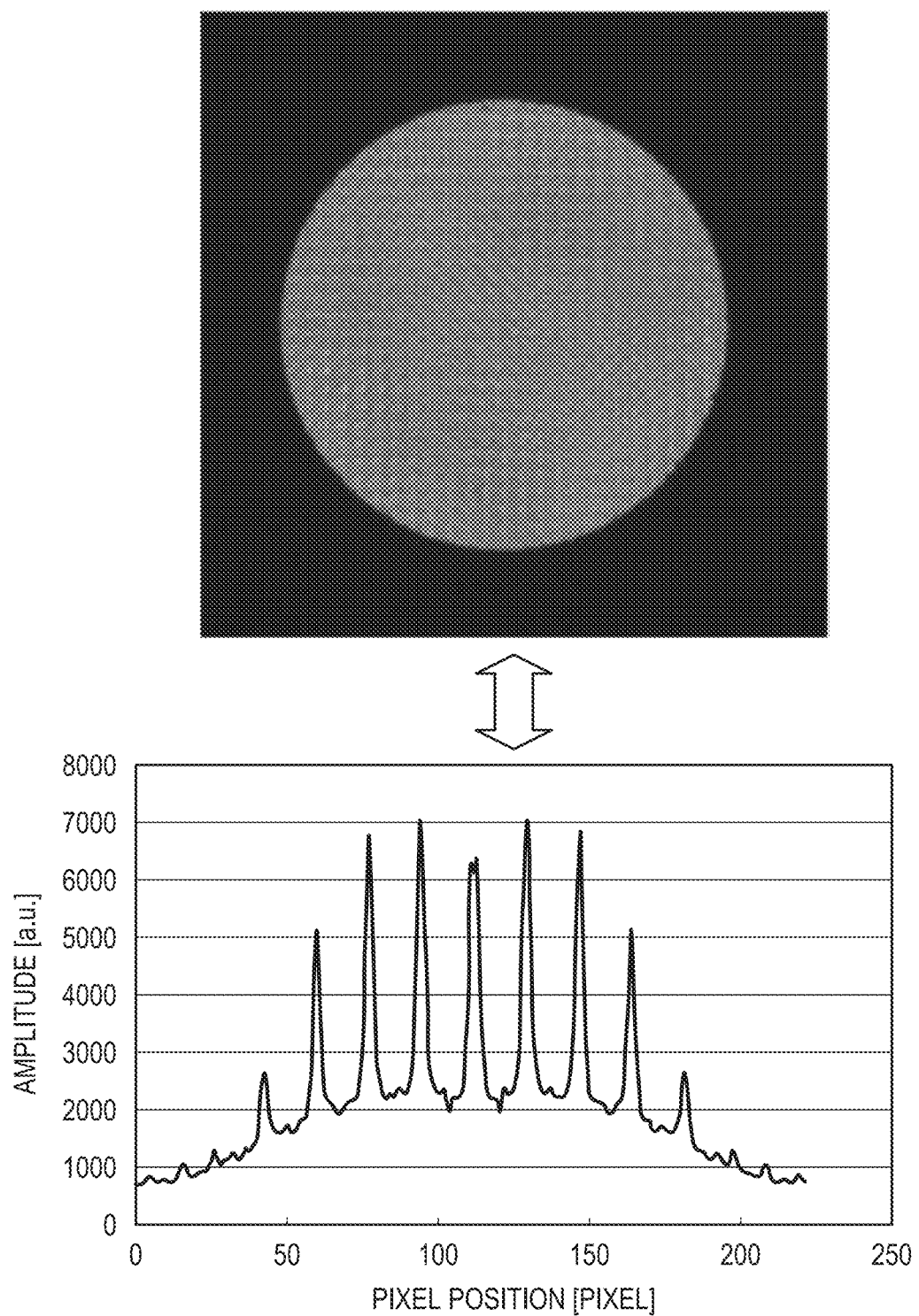

FIG. 12

AVERAGE VALUE OF APERTURE DIAMETER: $D_{AVE}$ = 30 μm
MINIMUM DOT SIZE: Δ = 0.8 μm

| NUMBER OF DOTS P ON ONE SIDE | LENGTH L OF ONE SIDE Δ×P [mm] | SIZE RATIO (Δ×P)/$D_{AVE}$ | VISUAL RECOGNITION OF MACROSTRUCTURE |
|---|---|---|---|
| 5000 | 4 | 133.33 | NOT RECOGNIZED |
| 2000 | 1.6 | 53.33 | NOT RECOGNIZED |
| 1000 | 0.8 | 26.67 | NOT RECOGNIZED |
| 750 | 0.6 | 20.00 | RECOGNIZED |
| 400 | 0.32 | 10.67 | RECOGNIZED |
| 250 | 0.2 | 6.67 | RECOGNIZED (DIFFRACTED LIGHT OF ACROCYCLE) |
| 200 | 0.16 | 5.33 | RECOGNIZED (DIFFRACTED LIGHT OF ACROCYCLE) |
| 125 | 0.1 | 3.33 | RECOGNIZED (DIFFRACTED LIGHT OF ACROCYCLE) |

DIFFUSED LIGHT STATE

OPTICAL BODY, DIFFUSER PLATE, DISPLAY DEVICE, PROJECTION DEVICE, AND LIGHTING DEVICE

CROSS REFERENCE TO PRIOR APPLICATION

This application is a National Stage Patent Application of PCT International Patent Application No. PCT/JP2017/043625 (filed on Dec. 5, 2017) under 35 U.S.C. § 371, which claims priority to Japanese Patent Application No. 2016-256465 (filed on Dec. 28, 2016), which are all hereby incorporated by reference in their entirety.

TECHNICAL FIELD

The present invention relates to an optical body, a diffuser plate, a display device, a projection device, and a lighting device.

BACKGROUND ART

In order to change diffusion properties of light, a diffuser plate that diffuses incident light in a desired direction is frequently used. Such a diffuser plate has an optical body for achieving a desired diffusion state on its surface. A kind of such an optical body has a microlens structure in which a plurality of microlenses having a size of approximately several tens of micrometers are located.

Patent Literature 1 below, for example, discloses an optical film including microlenses in which a plurality of microarray regions in which a plurality of microlenses are formed are located. Such an optical film is characterized in that a plurality of microlenses formed in a microarray region have surface shapes different from each other.

One of methods of producing such microlenses is a method of producing microlenses by a projection exposure method as indicated in Patent Literature 2 below, for example. This Patent Literature 2 discloses a method of forming microlenses having uniformized optical properties on the whole substrate by using a mask having gradation and by repeating exposure. This method of producing microlenses is characterized in that the dose amount in exposure is changed.

CITATION LIST

Patent Literature

Patent Literature 1: JP 2012-13748A
Patent Literature 2: JP 2005-275000A

SUMMARY OF INVENTION

Technical Problem

However, the inventors of the present application conducted intense studies about an optical body having a plurality of microlenses, and as a result, could obtain results as indicated below. That is, it has been found out that, even in a case where an optical body having a non-periodic microlens array structure as disclosed in Patent Literature 1 above is produced by such a production method as disclosed in Patent Literature 2 above by which uniform optical properties can be obtained, a macrostructure larger than the non-periodic structure is found in some cases because of a difference in dispersibility between certain regions of the non-periodic structure. Specifically, it has been confirmed that, even in a case where various optical properties are improved because of the non-periodic structure, dispersibility of a basic structure in the non-periodic structure causes a macroscopic spotted pattern to be visually recognized, and periodicity occurs in optical properties of the optical body.

Thus, the present invention was made in view of the above-described problems, and the present invention has an object to provide an optical body, a diffuser plate, a display device, a projection device, and a lighting device that can suppress, in an optical body in which a microlens array as a non-periodic structure is arranged and deployed in a wide range, occurrence of periodic optical properties in a structural unit larger than the non-periodic structure.

Solution to Problem

According to an aspect of the present invention in order to solve the above-described problem, there is provided an optical body including a single non-periodic structure region or a collection of a plurality of non-periodic structure regions, the non-periodic structure region being composed of a single lens group including a plurality of single lenses. In the non-periodic structure region, a located state of the single lens group is non-periodic as a whole. A ratio of a size of the non-periodic structure region to an average aperture diameter of the single lenses in the non-periodic structure region is more than or equal to 25.

It is preferable that, in the non-periodic structure region, a located pitch of the single lens group or an aperture diameter of the single lenses, or at least either a radius of curvature of the single lenses or a shape of the single lenses changes, or the located pitch of the single lens group or the aperture diameter of the single lenses, and at least either the radius of curvature of the single lenses or the shape of the single lenses change.

It is preferable that, in the non-periodic structure region, a changing rate, from a reference, of a located pitch of the single lens group or an aperture diameter of the single lenses, or at least either a radius of curvature of the single lenses or a shape of the single lenses, or a changing rate, from a reference, of the located pitch of the single lens group or the aperture diameter of the single lenses, and at least either the radius of curvature of the single lenses or the shape of the single lenses is more than or equal to 5%.

The surface shape of the single lenses in the non-periodic structure region may be a spherical shape in which a reference radius of curvature R [μm] and a reference aperture diameter D [μm] satisfy a relation of R≥(D/2) or an aspherical shape.

It is preferable that the reference aperture diameter D of the single lenses in the non-periodic structure region is more than or equal to 30 μm and less than or equal to 300 μm.

The optical body may be an optical body obtained by repeatedly locating the non-periodic structure regions identical to one another.

The optical body may be an optical body obtained by repeatedly locating the non-periodic structure regions different from one another.

A diffusion half angle of light transmitted through the optical body may be more than or equal to 20 degrees.

Further, according to another aspect of the present invention in order to solve the above-described problem, there is provided a diffuser plate including the above-described optical body on a surface.

Further, according to another aspect of the present invention in order to solve the above-described problem, there is provided a display device including a diffuser plate having the above-described optical body.

Further, according to another aspect of the present invention in order to solve the above-described problem, there is provided a projection device including a diffuser plate having the above-described optical body.

Further, according to another aspect of the present invention in order to solve the above-described problem, there is provided a lighting device including a diffuser plate having the above-described optical body.

Advantageous Effects of Invention

According to the present invention as described above, it is possible to suppress, in an optical body in which a microlens array as a non-periodic structure is arranged and deployed in a wide range, occurrence of periodic optical properties in a structural unit larger than the non-periodic structure.

BRIEF DESCRIPTION OF DRAWINGS

FIG. 8B is an explanatory diagram for describing a locating method of the single lens group that the optical body according to the embodiment includes.

FIG. 10A is an explanatory diagram showing an example of a result of visual recognition of a macro pattern.

FIG. 12 is an explanatory diagram for describing a relation between aperture diameter of the optical body and unit cell size related to visual recognition of a macro pattern.

DESCRIPTION OF EMBODIMENTS

Figure 1:
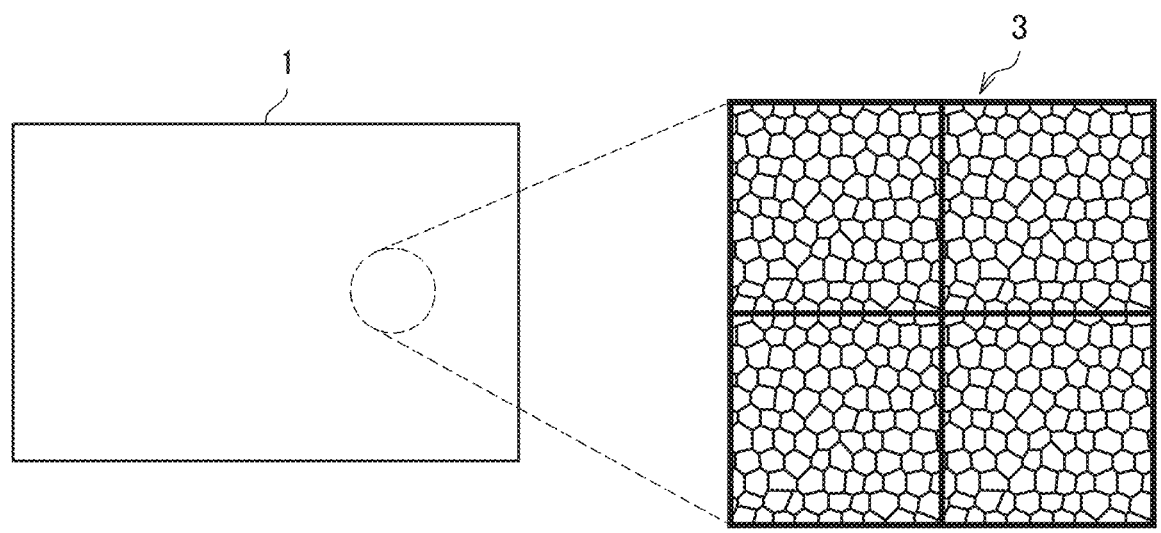
FIG. 1 is an explanatory diagram schematically showing an optical body according to an embodiment of the present invention.

Hereinafter, (a) preferred embodiment(s) of the present invention will be described in detail with reference to the appended drawings. Note that, in the present specification and the drawings, structural elements that have substantially the same function and structure are denoted with the same reference numerals, and repeated explanation is omitted.

Overview of Optical Body According to Embodiment of Present Invention

Prior to describing an optical body according to an embodiment of the present invention in detail, an overview of the optical body according to an embodiment of the present invention will be mentioned below briefly.

The optical body according to an embodiment of the present invention which will be described below in detail is a microlens array optical body having a light homogeneous diffusion function. Such an optical body has a structure in which convex or concave microlenses having the light diffusion function are arranged and deployed non-periodically.

As will be described below in detail, the inventors of the present application have revealed that, within a region of a conventional non-periodic microlens array structure or within a region in which non-periodic structure regions are arranged and deployed in a wide range with periodicity, a macrostructure larger than the non-periodic structure is found because of a difference in dispersibility between certain regions of the non-periodic structure. Specifically, it has been revealed that, even in a case where the non-periodic structure produces improvement effects such as improvement of granularity, bright bokeh, and moiré suppression, a macroscopic spotted pattern is visually recognized depending on dispersibility of a basic structure in the structure.

In the optical body according to an embodiment of the present invention which will be described below in detail, a macrostructure larger than a non-periodic structure is not visually recognized by setting a size ratio of a macrostructure to a microstructure at more than or equal to 25 both in a microstructure region of a non-periodic microlens array to be a basic structure and in a macrostructure region in which the basic structures are arranged and deployed in a wide range with periodicity.

Further, the above effects enable the optical body according to an embodiment of the present invention to provide a homogeneous display unit in an image display device having high brightness and high gradation, or the like, such as a liquid crystal backlight, various lighting devices (LED, laser, and the like), or a light emitting device such as a projector. Further, because of the inclusion of the function of deforming the distribution of light distribution angle, a compact lighting device, a highly precise light measurement instrument, a measurement medical instrument, or the like that suppresses light spots and has been controlled to have a predetermined distribution of light can be provided.

Hereinafter, the optical body according to an embodiment of the present invention having characteristics as described above will be described in detail.

(With Regard to Optical Body)

Hereinafter, the optical body according to an embodiment of the present invention will be described in detail with reference to FIG. 1 to FIG. 22C.

Figure 2A:
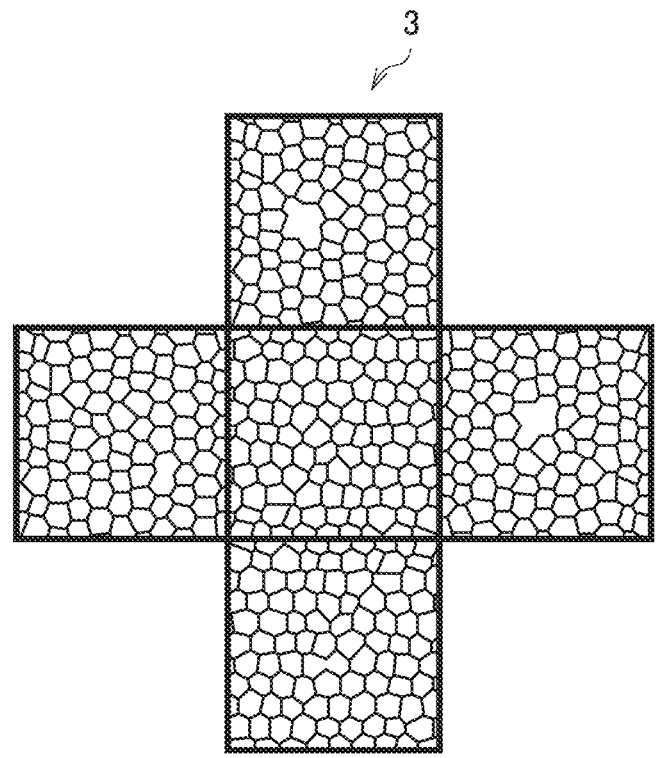
FIG. 2A is an explanatory diagram for describing location of unit cells that form the optical body according to the embodiment.
Figure 2B:
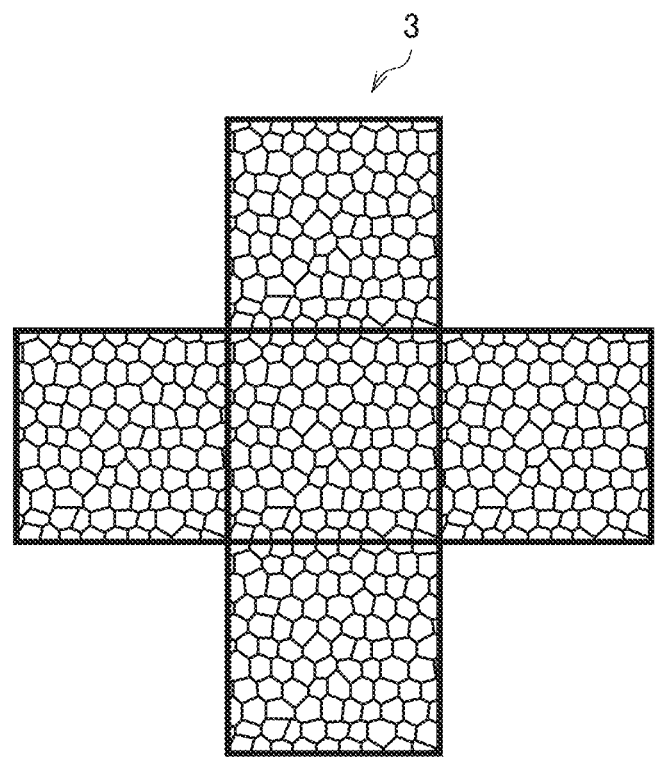
FIG. 2B is an explanatory diagram for describing location of unit cells that form the optical body according to the embodiment.
Figure 3:
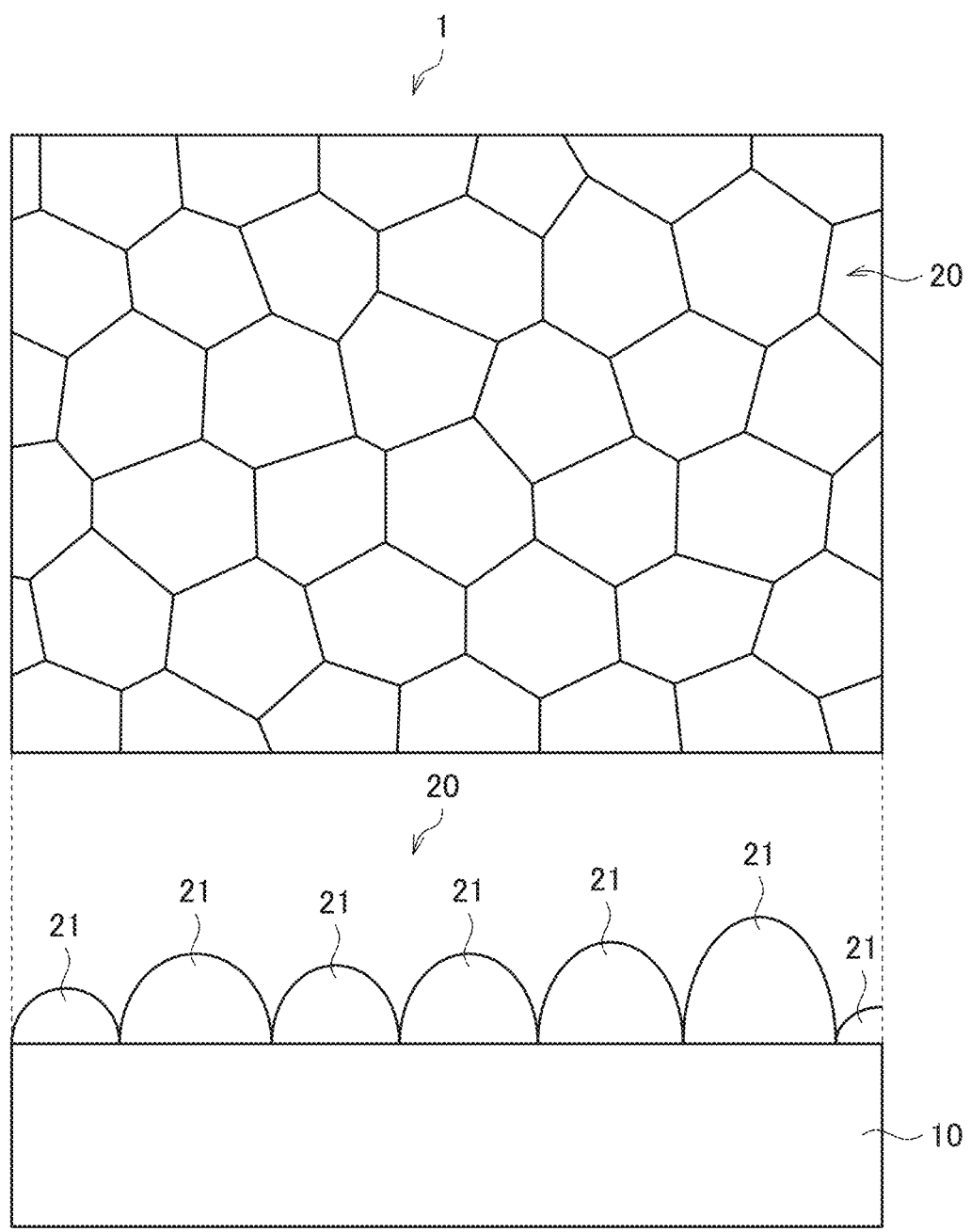
FIG. 3 is an explanatory diagram schematically showing part of a unit cell according to the embodiment.
Figure 4:
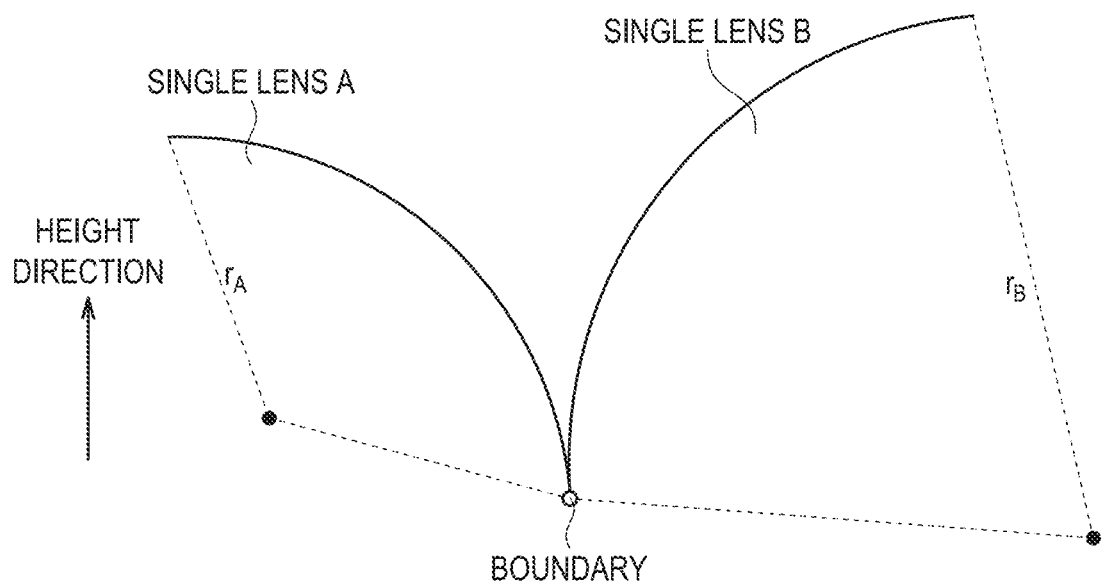
FIG. 4 is an explanatory diagram for describing single lenses that the optical body according to the embodiment has.
Figure 5:
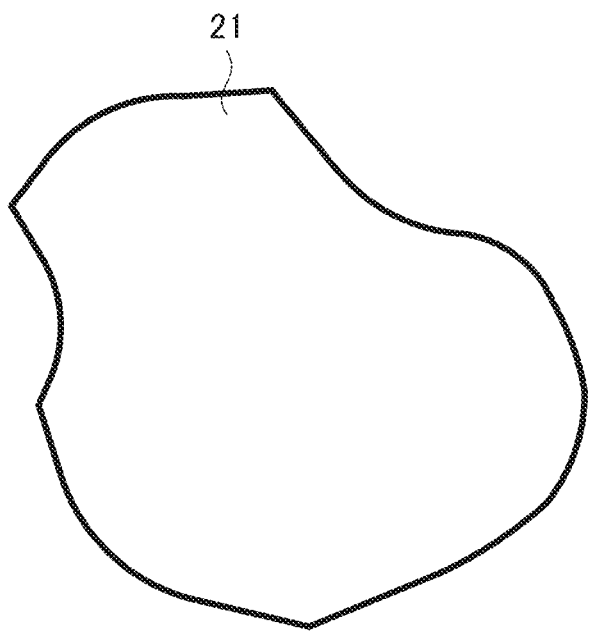
FIG. 5 is an explanatory diagram for describing single lenses that the optical body according to the embodiment has.
Figure 6:
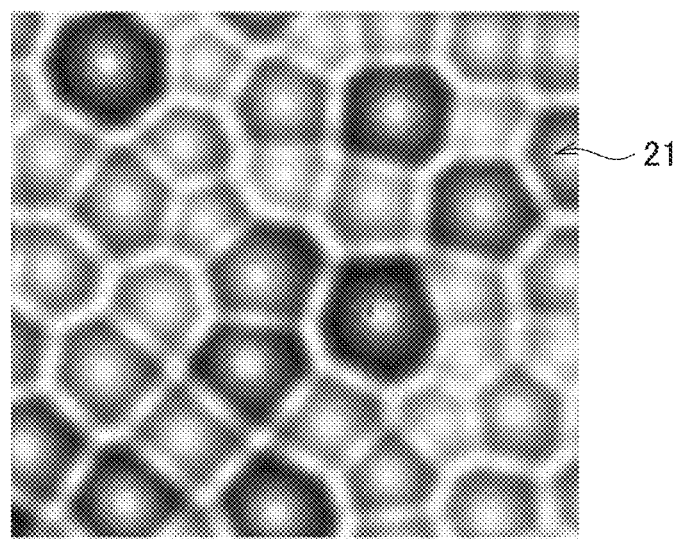
FIG. 6 is an electron micrograph of an example of a single lens group that the optical body according to the embodiment includes as seen from above.
Figure 9:
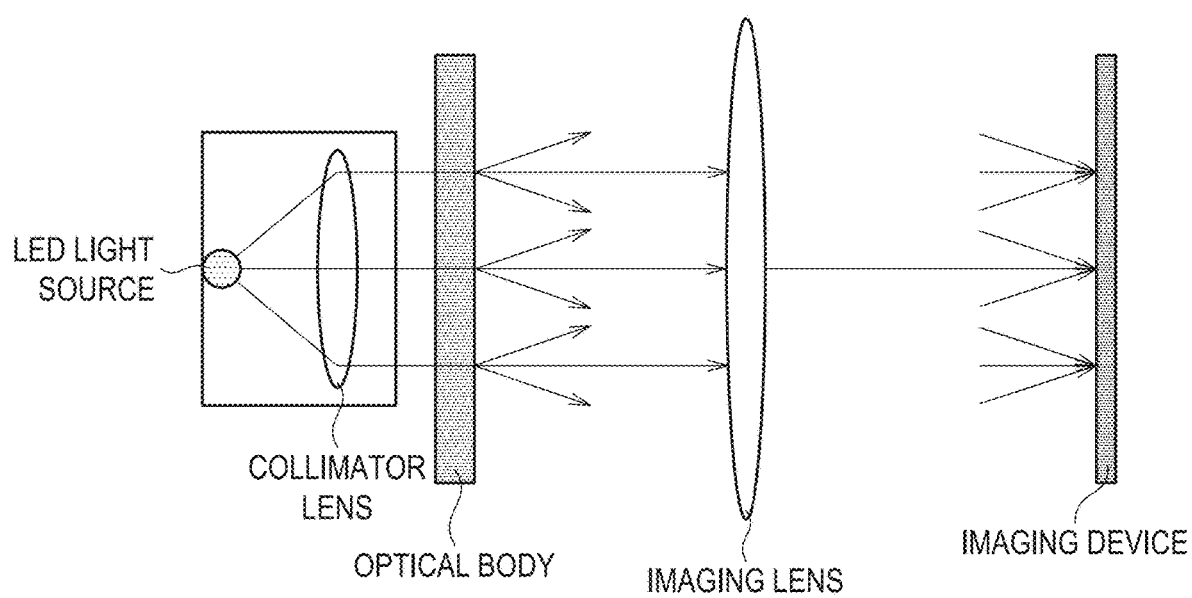
FIG. 9 is an explanatory diagram for describing a method of visually recognizing a macro pattern.
Figure 10B:
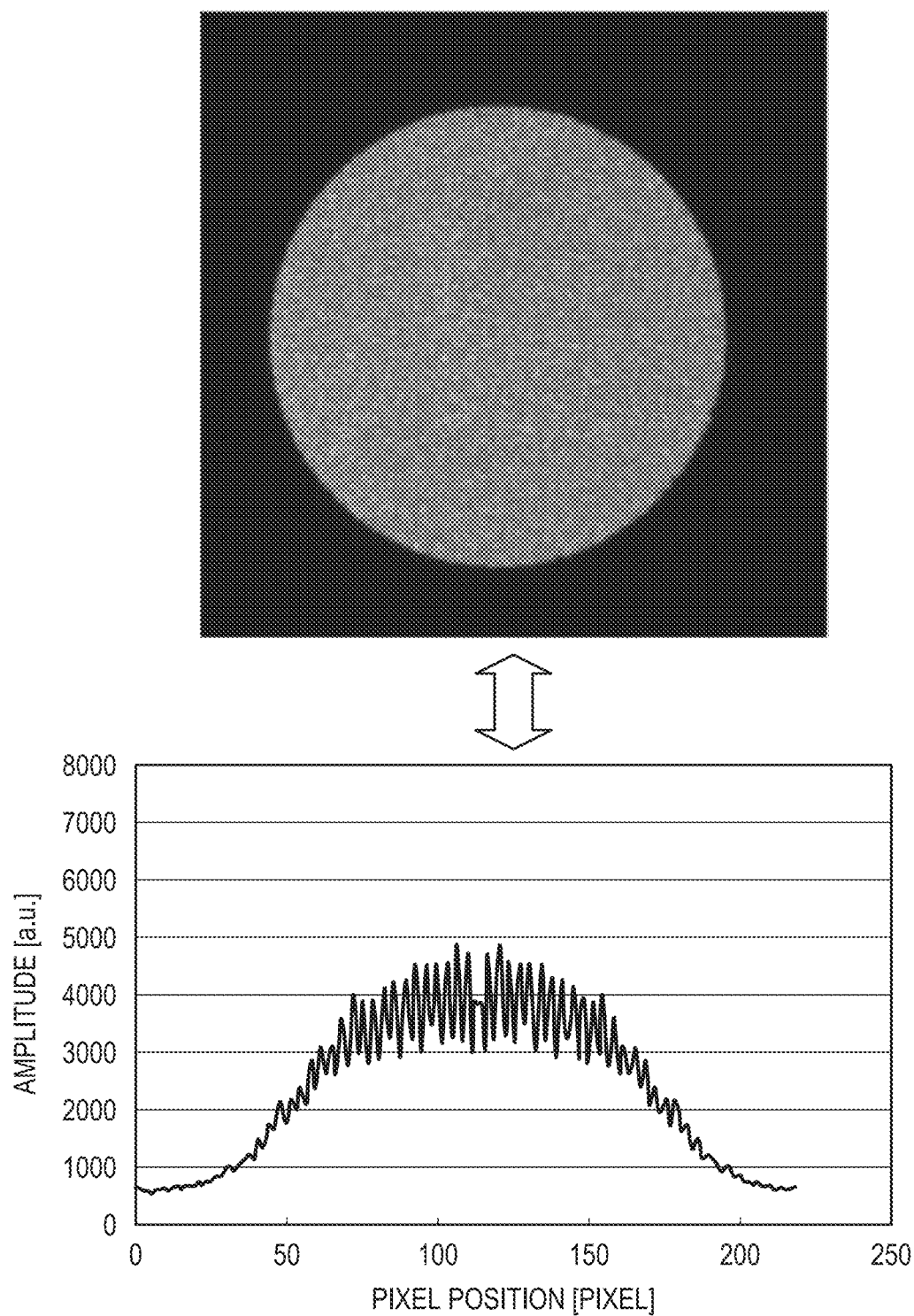
FIG. 10B is an explanatory diagram showing an example of a result of visual recognition of a macro pattern.
Figure 11:
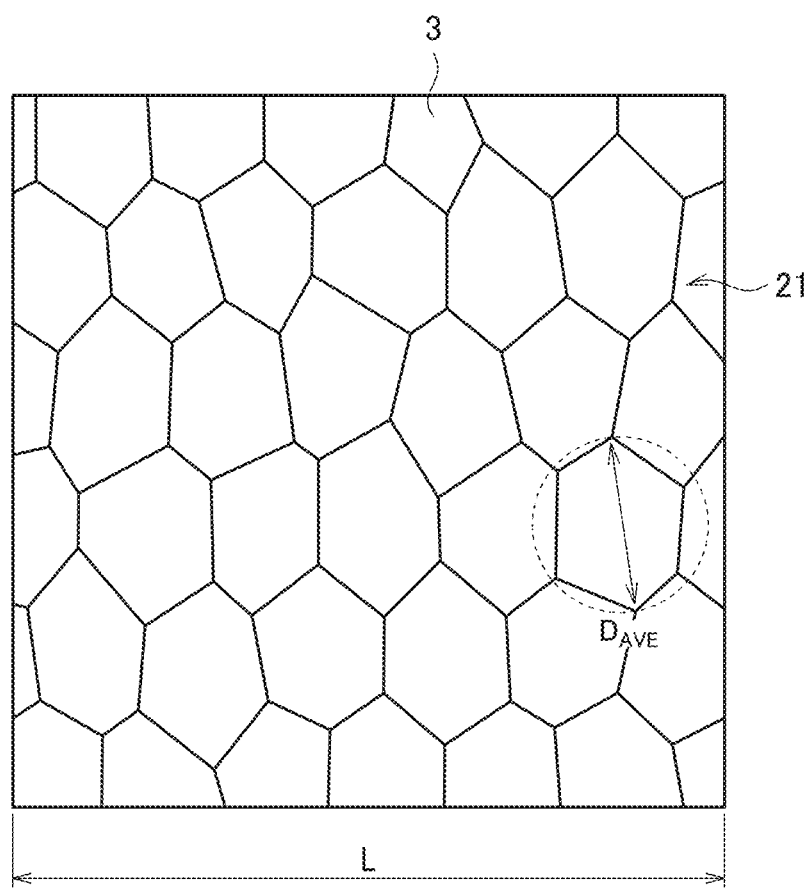
FIG. 11 is an explanatory diagram for describing a relation between aperture diameter of the optical body and unit cell size related to visual recognition of a macro pattern.
Figure 20:
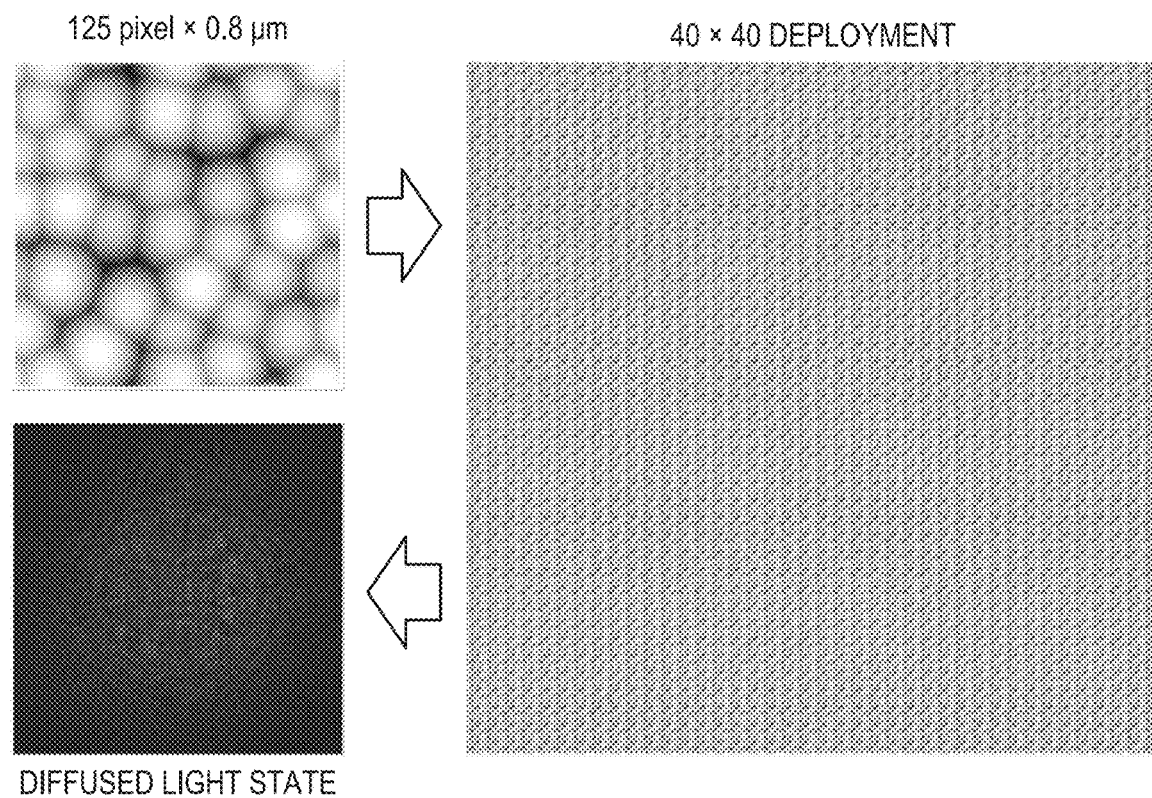
FIG. 20 is an explanatory diagram showing an example of a result of confirming presence/absence of a macro pattern.
Figure 21:
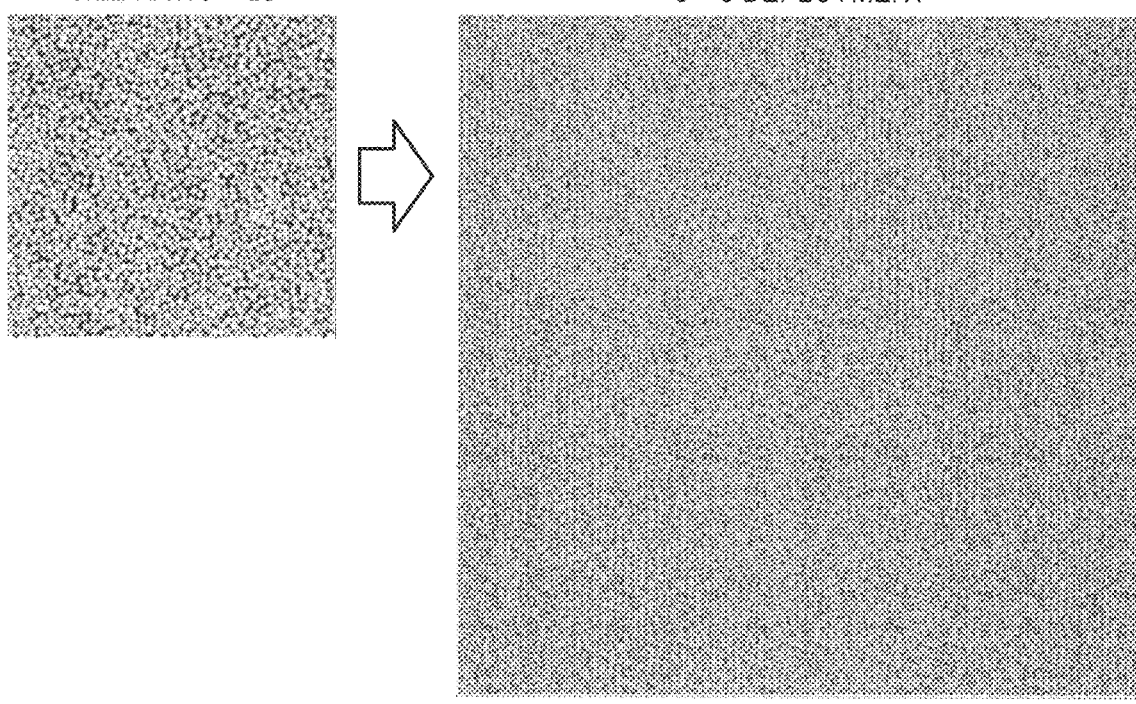
FIG. 21 is an explanatory diagram showing an example of a result of confirming presence/absence of a macro pattern.
Figure 22A:
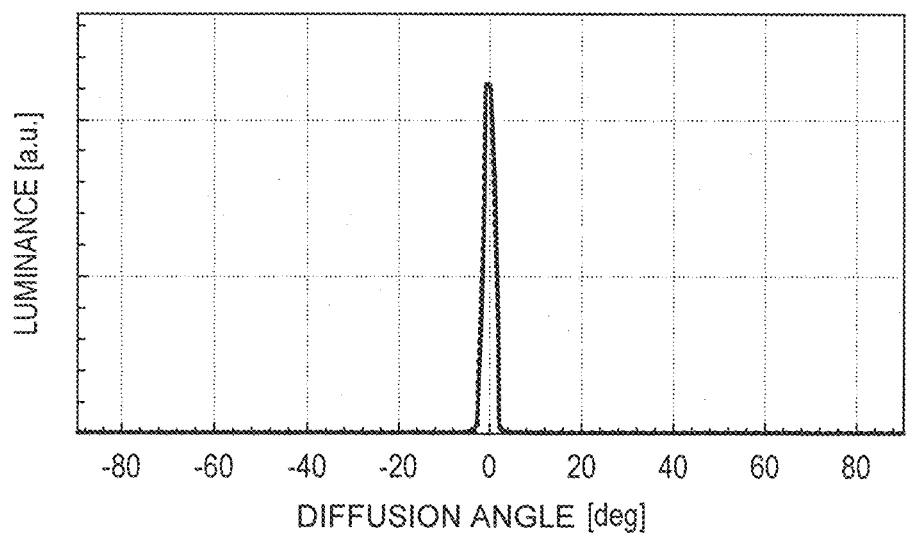
FIG. 22A is an explanatory diagram for describing the optical body according to the embodiment.
Figure 22B:
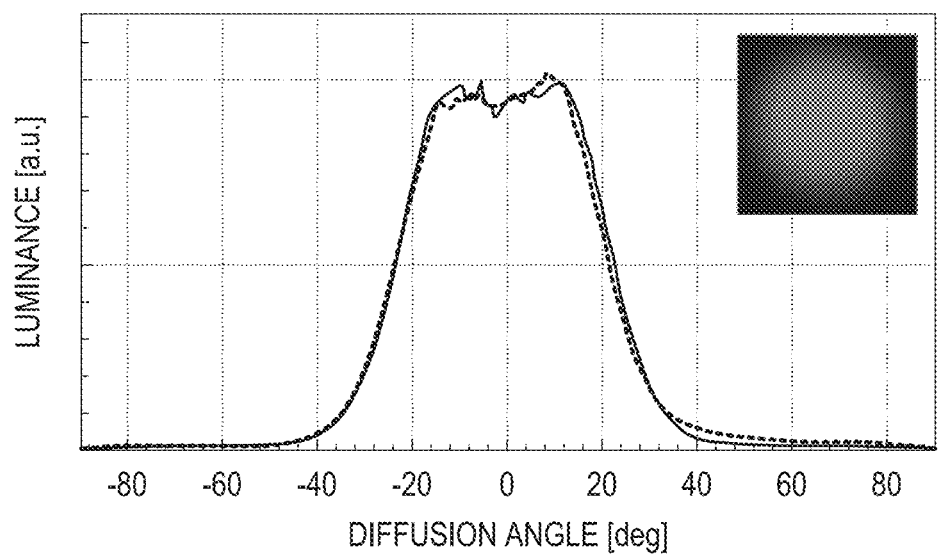
FIG. 22B is an explanatory diagram for describing the optical body according to the embodiment.
Figure 22C:
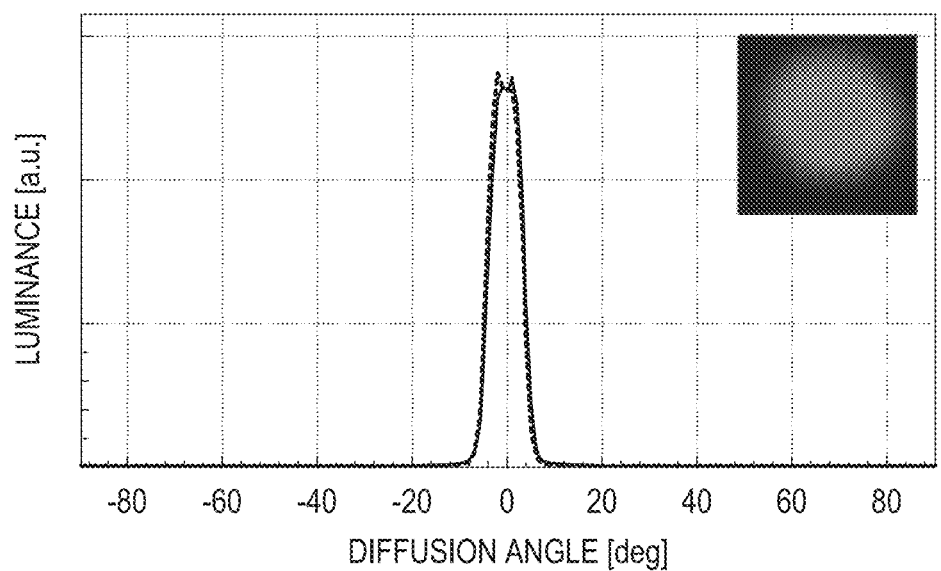
FIG. 22C is an explanatory diagram for describing the optical body according to the embodiment.

FIG. 1 is an explanatory diagram schematically showing the optical body according to an embodiment of the present invention. FIG. 2A and FIG. 2B are explanatory diagrams each for describing location of unit cells that form the optical body according to the present embodiment. FIG. 3 is an explanatory diagram schematically showing part of a unit cell according to the present embodiment. FIG. 4 and FIG. 5 are explanatory diagrams each for describing single lenses that the optical body according to the present embodiment has. FIG. 6 is an electron micrograph of an example of a single lens group that the optical body according to the present embodiment includes as seen from above. FIG. 7A to FIG. 8B are explanatory diagrams each for describing a locating method of the single lens group that the optical body according to the present embodiment includes. FIG. 9 is an explanatory diagram for describing a method of visually recognizing a macro pattern. FIG. 10A and FIG. 10B are explanatory diagrams each showing an example of a result of visual recognition of a macro pattern. FIG. 11 and FIG. 12 are explanatory diagrams each for describing a relation between aperture diameter of the optical body and unit cell size related to visual recognition of a macro pattern. FIG. 13 to FIG. 21 are explanatory diagrams each showing an example of a result of confirming presence/absence of a macro pattern. FIG. 22A to FIG. 22C are explanatory diagrams each for describing the optical body according to the embodiment.

An optical body 1 according to the present embodiment is a microlens array optical body obtained by locating a microlens group including a plurality of microlenses (single lenses) on a substrate. This optical body 1 is composed of a plurality of unit cells 3 as schematically shown in FIG. 1. Further, between the unit cells 3, a layout pattern (location pattern) of a plurality of microlenses provided in the unit cells 3 is continuous in the arrangement direction of the unit cells (in other words, the array arrangement direction), as schematically shown in the right diagram in FIG. 1.

Here, FIG. 1 presents an illustration using a case in which the unit cells 3 constituting the optical body 1 have a rectangular shape as an example, whilst the shape of the unit cells 3 is not limited to that shown in FIG. 1, but should only be a shape that can fill a plane without a gap, such as an equilateral triangular shape or a regular hexagonal shape, for example.

The number of the unit cells 3 constituting the optical body 1 according to the present embodiment is not particularly limited, but the optical body 1 may be composed of a single unit cell 3, or may be composed of a plurality of unit cells 3.

Here, each unit cell 3 can be regarded as a non-periodic structure region including a non-periodic structure, as will be described below in detail. In these unit cells 3, the located pitch of the single lens group or the aperture diameter of the single lenses, or at least either the radius of curvature of the single lenses or the shape of the single lenses changes, or the located pitch of the single lens group or the aperture diameter of the single lenses, and at least either the radius of curvature of the single lenses or the shape of the single lenses change.

The optical body 1 according to the present embodiment may be an optical body obtained by repeatedly locating the unit cells 3 having non-periodic structures different from one another as schematically shown in FIG. 2A, or may be an optical body obtained by repeatedly locating the unit cells 3 having a non-periodic structure identical to one another as schematically shown in FIG. 2B.

FIG. 3 is an explanatory diagram schematically showing a structure of part of the unit cell 3 according to the present embodiment. As schematically shown in FIG. 3, the unit cell 3 according to the present embodiment has a transparent base material 10 and a single lens group 20 formed on a surface of the transparent base material 10.

<With Regard to Transparent Base Material 10>

The transparent base material 10 is a base material made of a material that can be assumed as being transparent in a wavelength band of light incident on the optical body 1 according to the present embodiment. This transparent base material 10 may be a film-like material or may be a plate-like material. The material of this base material is not particularly limited. It is also possible to use publicly-known resin such as polymenthyl methacrylate (PMMA), Polyethylene terephthalate (PET), polycarbonate (PC), Cyclo Olefin Copolymer (COC), Cyclo Olefin Polymer (COP), or Triacetylcellulose (TAC), for example, as the transparent base material 10, and it is also possible to use publicly-known optical glass such as quartz glass, borosilicate glass, or high transmission crown glass. Although FIG. 3 presents an illustration using a case in which the transparent base material 10 is rectangular as an example, the shape of the transparent base material 10 is not limited to rectangle, but may have any shape depending on the shape of a display device, a projection device, a lighting device, or the like in which the optical body 1 is mounted, for example.

<With Regard to Single Lens Group 20>

The single lens group 20 including a plurality of single lenses 21 is formed on the surface of the transparent base material 10. In the optical body 1 according to the present embodiment, it is preferable that the single lens group 20 is formed in such a manner that the plurality of single lenses 21 are adjacent to each other (in other words, in such a manner that a gap (flat portion) does not exist between the single lenses 21) as schematically shown in FIG. 3. By locating the single lenses 21 on the transparent base material 10 without a gap (in other words, locating the single lenses 21 in such a manner that the filling rate of the single lenses is 100%), a component of incident light that transmits through the diffuser plate surface as it is without scattering on the diffuser plate surface (hereinafter, also referred to as a "0-th order transmitted light component") can be reduced. As a result, in the single lens group 20 including the plurality of single lenses 21 located adjacent to each other, diffusion performance can be improved further.

Further, in the single lens group 20 according to the present embodiment, each single lens 21 is not located regularly, but is located irregularly (at random), as schematically shown in FIG. 3. Here, "irregular" means that regularity concerning the location of the single lenses 21 does not exist practically, in an arbitrary region of the single lens group 20 in the optical body 1. Thus, even if a certain kind of regularity exists in the location of the single lenses 21 at a microscopic region in an arbitrary region, the arbitrary region having no regularity in the location of the single lenses 21 as a whole is assumed to be determined as "irregular". Note that an irregular locating method of the single lenses 21 in the single lens group 20 according to the present embodiment will be described below again in detail.

In the present embodiment, the single lens 21 constituting the single lens group 20 may be a convex lens as schematically shown in FIG. 3, or may be a concave lens. Further, in the single lens group 20 according to the present embodiment, the surface shape of each single lens 21 is not particularly limited, but may only include a spherical component, or may include an aspherical component.

Further, the single lens group 20 according to the present embodiment has variations not only in the location of each single lens 21 as described above, but also in the aperture diameter and radius of curvature of each single lens 21 in the single lens group 20 as a whole.

By providing a plurality of single lenses 21 so as to be adjacent to each other, forming the single lenses 21 irregularly on the transparent base material 10, and providing variations (randomness) for the aperture diameter and radius of curvature of the respective single lenses 21, the respective single lenses 21 do not have an outer shape identical to each other, but have various shapes as schematically shown in FIG. 3, and many single lenses 21 no longer have symmetry.

In such a case, as schematically shown in FIG. 4, a situation in which a single lens A has a radius of curvature $r_A$, whereas a single lens B has a radius of curvature $r_B$ ($\neq r_A$) occurs frequently. In a case where adjacent single lenses are different in radius of curvature, the boundary between the adjacent single lenses is not composed of a straight line alone, but at least partly includes a curve. As a result, as schematically shown in FIG. 5, for example, the outer shapes of the single lenses 21 (a projection trajectory of outer shapes in a case of looking down on the single lenses 21) are composed of a plurality of bent and curved boundaries different from one another. When the boundaries between single lenses at least partly include curves, regularity of the location at the boundaries between the single lenses is further broken, and a diffraction component can be reduced further.

FIG. 6 is an SEM picture in a case where part of the single lens group 20 in the optical body 1 according to the present embodiment is monitored from above with a scanning electron microscope (SEM). As is apparent from FIG. 6, it is understood that the outer shapes (a look-down projection trajectory) of the single lenses 21 constituting the single lens group 20 have various shapes, and that the single lenses 21 are also different in aperture diameter from one another.

<With Regard to Method of Locating Single Lenses 21>

Hereinafter, a method of locating the single lenses 21 as described above will be specifically described.

In the unit cells 3 of the optical body 1 according to the present embodiment, the single lens group 20 in which a plurality of single lenses 21 having characteristics as described above are located can be achieved mainly by the following two locating methods.

The first locating method is a locating method of locating the single lenses 21 having a shape to serve as a reference at random from the beginning. Hereinafter, this locating method will also be referred to as a "random locating method." In this locating method, the single lenses 21 having a shape to serve as a reference are located at random, and then the shape (that is, aperture diameter and radius of curvature) of the single lenses 21 is varied (perturbed). Therefore, as is apparent from the SEM picture showing an actual manner of location of the single lens group 20 shown in FIG. 6, regularity cannot be found in the location of the single lenses 21 even in a case of looking down on the single lens group 20 macroscopically to some degree.

The second arrangement method is a scheme of once setting a state to serve as a reference (hereinafter also referred to as an "initial arrangement state") in which the single lenses 21 having a shape to serve as a reference are arranged regularly, and then varying (perturbing) the shape (that is, aperture diameter and radius of curvature) of the single lenses 21 and the located position (in more detail, the vertex position of the single lenses 21) from the initial arrangement state. Hereinafter, this locating method will also be referred to as a "reference locating method." In this locating method, randomness is provided for the shape and location of the single lenses 21 upon regularly arranging the single lenses 21, and thus, the location is such that the initial arrangement state can be estimated to some degree when looking down on the single lens group 20 macroscopically to some degree.

[With Regard to Random Locating Method]

First, a flow of the random locating method will be briefly described with reference to FIG. 7A and FIG. 7B.

Figure 7A:
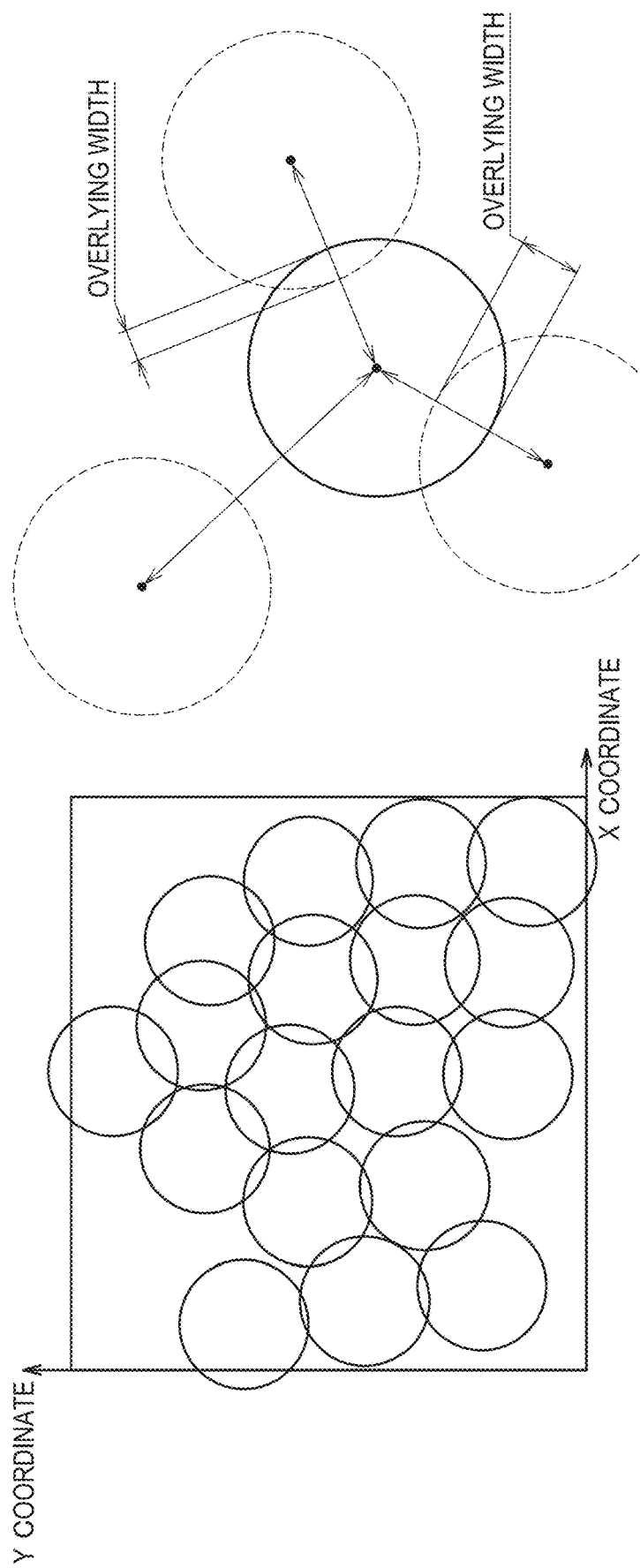
FIG. 7A is an explanatory diagram for describing a locating method of the single lens group that the optical body according to the embodiment includes.

In the random locating method, in a case of considering the lens located position in the xy coordinate system as shown in FIG. 7A, the x coordinate and y coordinate of the lens located position are settled by random numbers. On this occasion, for a single lens 21 of interest, the distance from each single lens 21 already located is calculated, and if the overlying width with the single lenses 21 already located falls within a previously set allowable range, the single lens 21 of interest is located. Conversely, in a case where the calculated overlying width exceeds the allowable range, the single lens 21 of interest is not located. In this manner, the initial arrangement in the random locating method is settled.

Figure 7B:
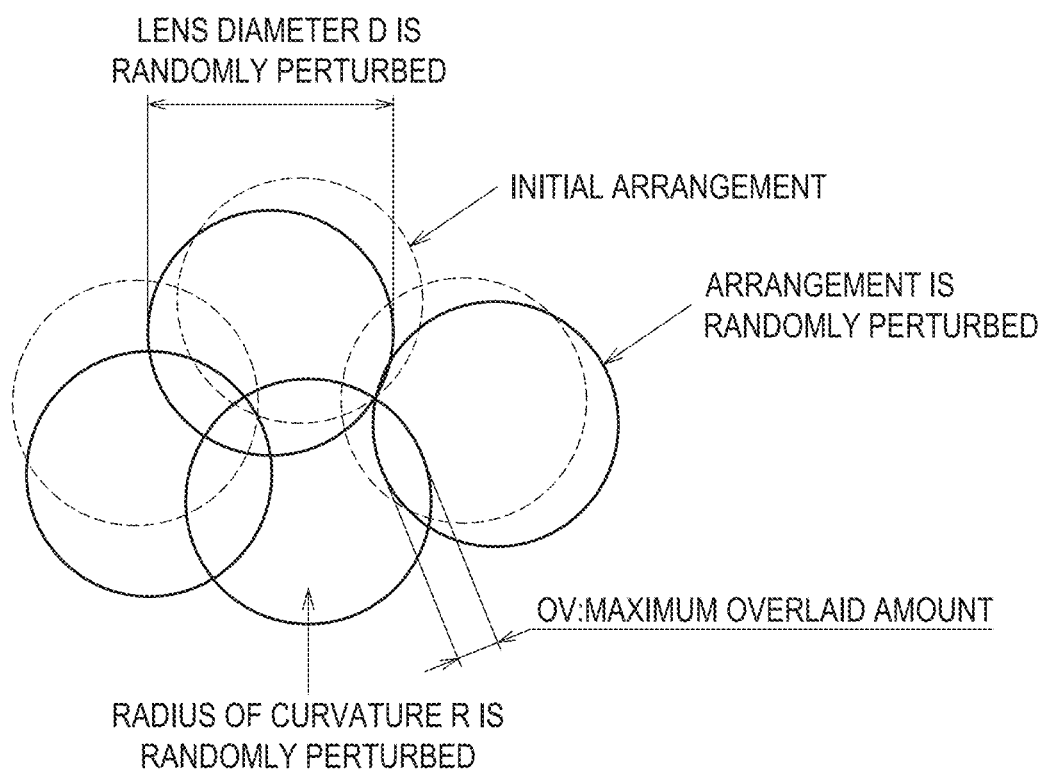
FIG. 7B is an explanatory diagram for describing a locating method of the single lens group that the optical body according to the embodiment includes.

The allowable range in the locating method as described above is a maximum overlaid amount $O_v$ shown in FIG. 7B. This maximum overlaid amount $O_v$ can be regarded as the maximum value of the overlying width between the single lenses 21 adjacent to each other.

The foregoing is an overview of the random locating method, and a more specific algorithm for the random locating method is not particularly limited, but a publicly-known method as disclosed in JP 2012-181816A, for example, can be utilized.

By further perturbing the aperture diameter D and the radius of curvature R of the single lenses 21 as shown in FIG. 7B as parameters after settling the initial arrangement in the above manner, the single lenses 21 having random shapes can be located at random, and occurrence of a flat portion can be suppressed.

In the random locating method as described above, it is preferable that a relation expressed by Expression (101) below holds where $O_v$ [μm] represents the maximum value of the overlying width between two single lenses 21 adjacent to each other in the single lens group 20, and $D_1$ [μm] and $D_2$ [μm] respectively represent the aperture diameters of the two single lenses 21 adjacent to each other. In a case where the relation expressed by Expression (101) below does not hold, the degree of variations in parameter for achieving the random location becomes insufficient, and it may be difficult to achieve sufficient randomness.

$$\frac{D_1 + D_2}{4} \geq O_V \qquad \text{Expression (101)}$$

[With Regard to Reference Locating Method]

Subsequently, a flow of the reference locating method will be briefly described with reference to FIG. 8A and FIG. 8B.

Figure 8A:
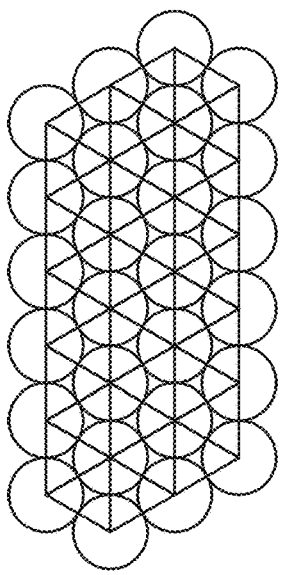
FIG. 8A is an explanatory diagram for describing a locating method of the single lens group that the optical body according to the embodiment includes.

As shown in FIG. 8A, in the reference locating method, first, an initial arrangement state to serve as a reference is set. A regular arrangement state of the single lenses 21 is not particularly limited, but a rectangular location in which the vertex positions of the single lenses 21 are located in a square shape, a hexagonal location in which the vertex positions of the single lenses 21 are located at positions corresponding to the vertices of a hexagon and the center of the hexagon, or the like may be utilized as appropriate. On this occasion, in order to prevent a flat portion from occurring where possible in the single lens group 20 having been subjected to the reference locating method, it is preferable that the regular arrangement state is a close packed arrangement state such as a hexagonal close packed lattice.

In this reference locating method, the lattice spacing (a reference lattice pitch G in FIG. 8B) is used as a parameter, as shown in the diagram at the middle on the left side in FIG. 8A. Then, as shown in the diagram at the bottom on the left side in FIG. 8A, the lattice spacing which is a parameter is reduced from a value corresponding to the close packed pattern. Accordingly, as shown in the diagram at the top on the right side in FIG. 8A, the respective single lenses overlie one another, so that there is no flat portion.

Thereafter, as shown in the diagram at the middle on the right side in FIG. 8A, the lens center (vertex position) of each single lens 21 is moved from the lattice point at random. Specifically, using the maximum moved distance from the lattice point as a parameter (a maximum perturbation amount M in FIG. 8B), a moved distance, which is the product of a random number of 0 to 1 and the maximum moved distance, is settled individually. Further, a moved angle is also settled using a random number. Accordingly, as shown in the diagram at the bottom on the right side in FIG. 8A, the final locating pattern of the single lenses 21 is settled.

Thereafter, by further perturbing the aperture diameter D and the radius of curvature R of the single lenses 21 as shown in FIG. 8B as parameters, the single lenses 21 having random shapes can be located at random.

The method of locating the single lenses 21 according to the present embodiment has been specifically described above with reference to FIG. 7A to FIG. 8B.

In the method of locating the unit cells 3 as described above, it is preferable that a changing rate, from the reference, of the located pitch of the single lens group or the aperture diameter of the single lenses, or at least either the radius of curvature of the single lenses or the shape of the single lenses (that is, the perturbation amount in each of the above-described locating method), or a changing rate, from the reference, of the located pitch of the single lens group or the aperture diameter of the single lenses, and at least either the radius of curvature of the single lenses or the shape of the single lenses is more than or equal to 5%. When the changing rate from the reference (that is, perturbation amount) is more than or equal to 5%, non-periodicity can be reliably introduced into the single lens group 20 constituting the unit cell 3.

Further, it is preferable that the surface shape of the single lenses 21 in the unit cell 3 is a spherical shape in which the reference radius of curvature R [μm] and the reference aperture diameter D [μm] satisfy a relation of $R \geq (D/2)$, or an aspherical shape. When the surface shape of the single lenses 21 constituting the unit cell 3 has a surface shape as described above, what is called top hat type diffusion properties can be achieved more reliably.

Note that the top hat type diffusion properties refer to an optical function that, with respect to collimated light in a visible light region and telecentric light having a principal ray with a collimating property and having a certain aperture, homogeneity of energy distribution is very high within an angular component in a certain region, and when the certain region of this angular component is exceeded, energy may be reduced abruptly. When such diffusion properties are achieved, a state in which a luminance distribution of diffused light of light incident on the single lens group 20 is substantially uniform in a predetermined diffusion angle range, and the luminance value of diffused light falls within the range of ±10% centering on the peak value within the predetermined diffusion angle range is achieved.

Further, it is preferable that the reference aperture diameter D is more than or equal to 30 μm and less than or equal to 300 μm in the unit cells 3 as described above.

<With Regard to Macro Pattern that May be Visually Recognized in Optical Body>

As mentioned earlier, the inventors of the present application have confirmed that, when periodically locating the unit cells 3 having non-periodic structures to form the optical body 1, a macroscopic spotted pattern is visually recognized depending on dispersibility of the basic structure within the unit cells 3. Hereinafter, the macro pattern that may be visually recognized in the optical body as confirmed by the inventors of the present application will be described in detail.

The macro pattern to which the inventors of the present application pay attention can be confirmed as an image by irradiating an optical body formed by periodically locating unit cells having non-periodic structures with a luminous flux of a Koehler illumination system obtained by changing illumination light emitted from an LED light source into collimated light by means of a collimator lens, and concentrating the state of the single lens group 20 surface on an imaging device such as CCD or CMOS by means of an imaging lens, as schematically shown in FIG. 9.

FIG. 10A shows an example of a result of visual recognition of a macro pattern in which the macro pattern to which the inventors of the present application pay attention was confirmed. As is apparent from a captured image at the upper side in FIG. 10A, it can be confirmed that a spotted pattern (that is, a macro pattern) having regularity in a unit larger than the size of the unit cell 3 exists in the image, and also in a luminance profile of a cross section shown at the lower side in FIG. 10A, luminance peaks exist periodically.

On the other hand, FIG. 10B shows an example of a result of visual recognition of a macro pattern in which the macro pattern to which the inventors of the present application pay attention was not confirmed. As is apparent from a captured image at the upper side in FIG. 10B, it is understood that a spotted pattern having regularity is not confirmed in the image, and periodic luminance peaks as shown in FIG. 10A do not exist although the luminance value fluctuates finely also in a luminance profile of a cross section shown at the lower side in FIG. 10B.

The inventors of the present application conducted intense studies about dispersibility of the basic structure that provides such a macro pattern paying attention to a relation between an average aperture diameter DAVE of the single lenses 21 constituting the unit cell 3 (which is also the reference aperture diameter D of the single lenses 21) and a length L of the unit cell 3 in the direction in which the unit cell 3 is located (that is, the length of one side of the unit cell 3), as schematically shown in FIG. 11.

Here, whatever production method is used when actually producing the single lens group 20, a resolution with which "drawing can no longer be performed more finely" exists. Hereinafter, this resolution occurring in drawing will be referred to as a "minimum dot size". When the minimum dot size is determined because of production restrictions or the like, the length L of one side of the unit cell 3 is obtained by multiplying the minimum dot size by the number of pixels constituting the unit cell 3. That is, in a case where the minimum dot size is $\Delta$ [μm] per pixel, and the unit cell 3 is produced in a size of P pixels×P pixels, the length L of one side of the unit cell 3 is expressed as L=$\Delta$×P.

Upon fixing the average value DAVE of the aperture diameter of the single lenses 21 (=the reference aperture diameter D of the single lenses 21) in the unit cell 3 at 30 μm, the inventors of the present application produced optical bodies respectively in line with the above-described random locating method while changing the number of dots P on one side setting the minimum dot size $\Delta$=0.8 μm (this is a minimum dot size in a production method generally used at the present time when producing optical bodies), and verified whether a macro pattern was confirmed. Note that, when producing the optical bodies, the value of the reference radius of curvature R was fixed at 20 μm, and the perturbation amount δ of each of the reference aperture diameter D and the reference radius of curvature R was set at 5%. The method schematically shown in FIG. 9 was utilized for confirming a macro pattern. Further, for some optical bodies, the state of diffused light was simulated utilizing a commercially available application for ray tracing simulation.

Obtained results are shown in FIG. 12, and a result of confirming a macro pattern in each optical body is shown in each of FIGS. 13 to 20.

Figure 13:
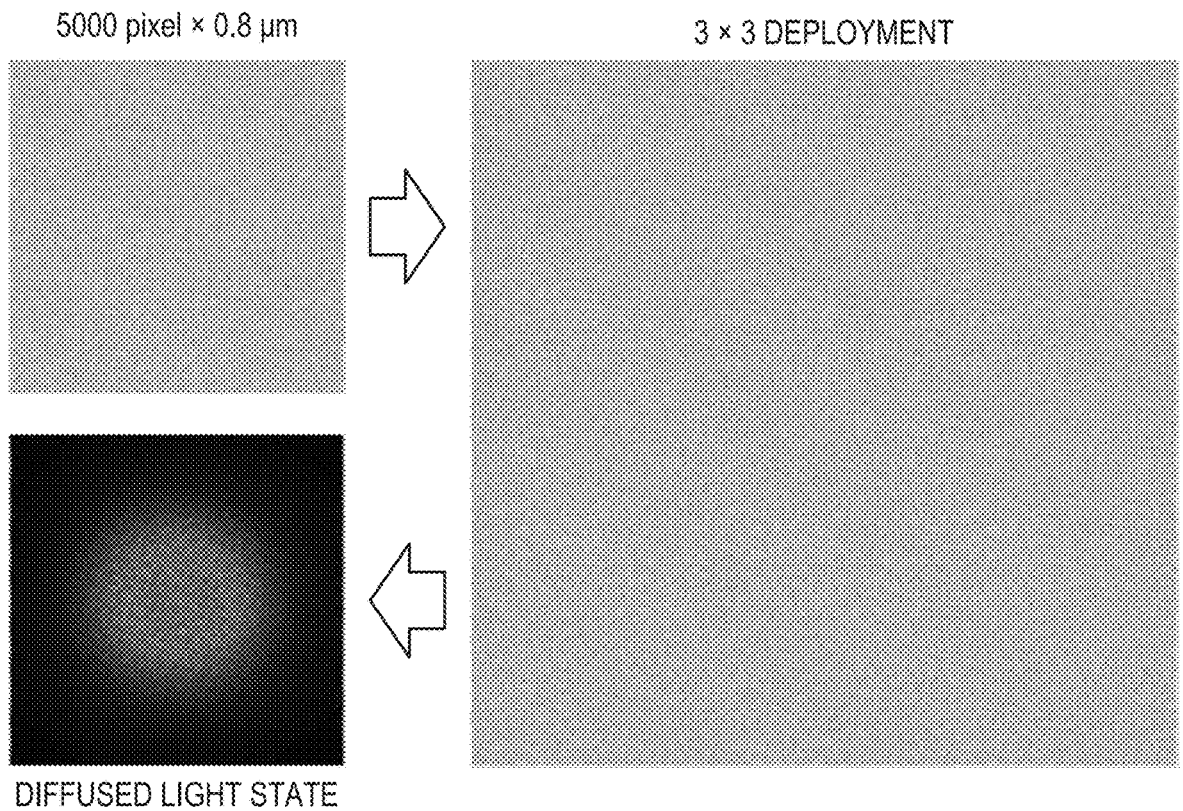
FIG. 13 is an explanatory diagram showing an example of a result of confirming presence/absence of a macro pattern.
Figure 14:
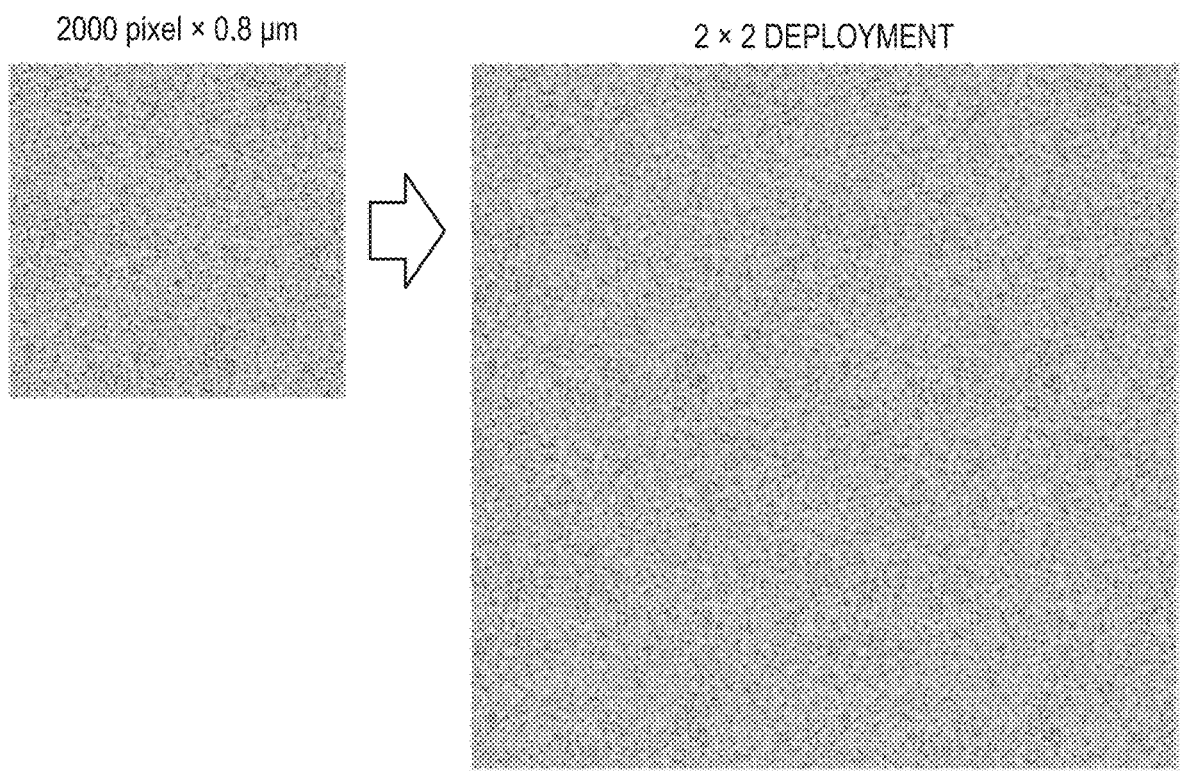
FIG. 14 is an explanatory diagram showing an example of a result of confirming presence/absence of a macro pattern.
Figure 15:
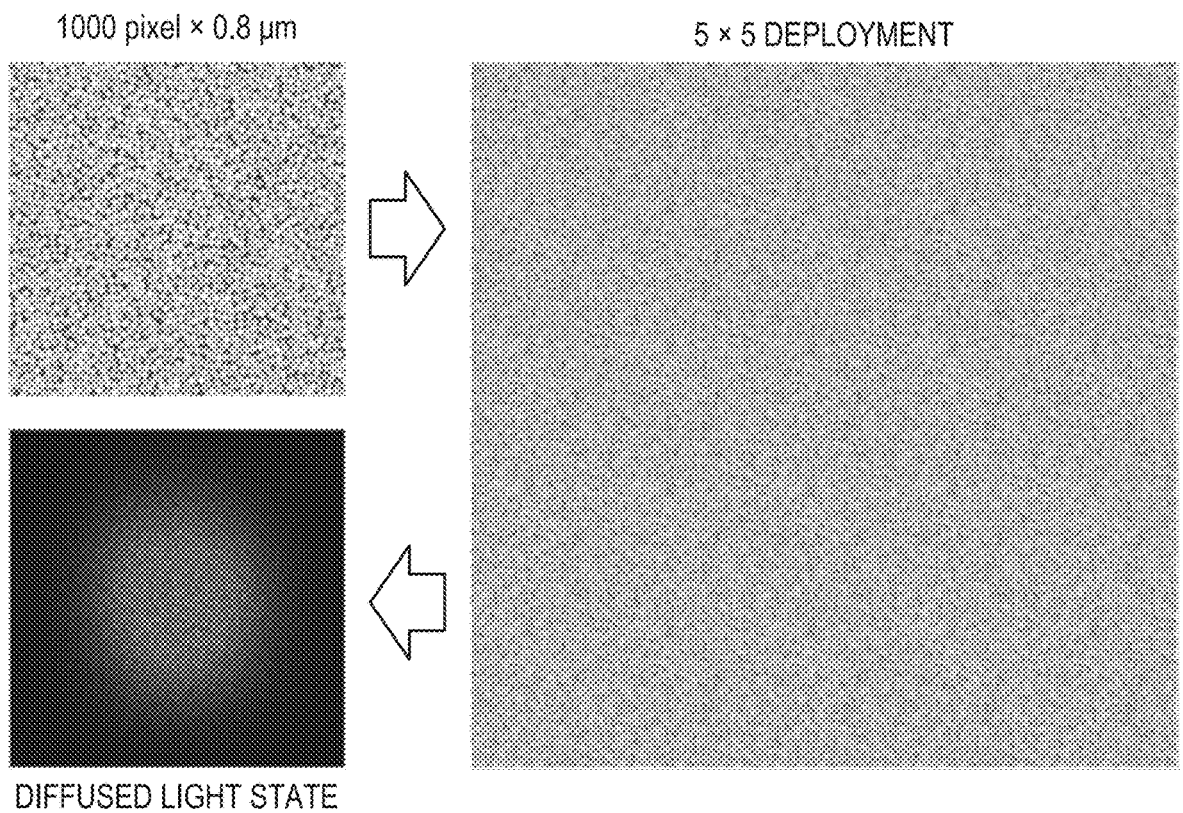
FIG. 15 is an explanatory diagram showing an example of a result of confirming presence/absence of a macro pattern.
Figure 16:
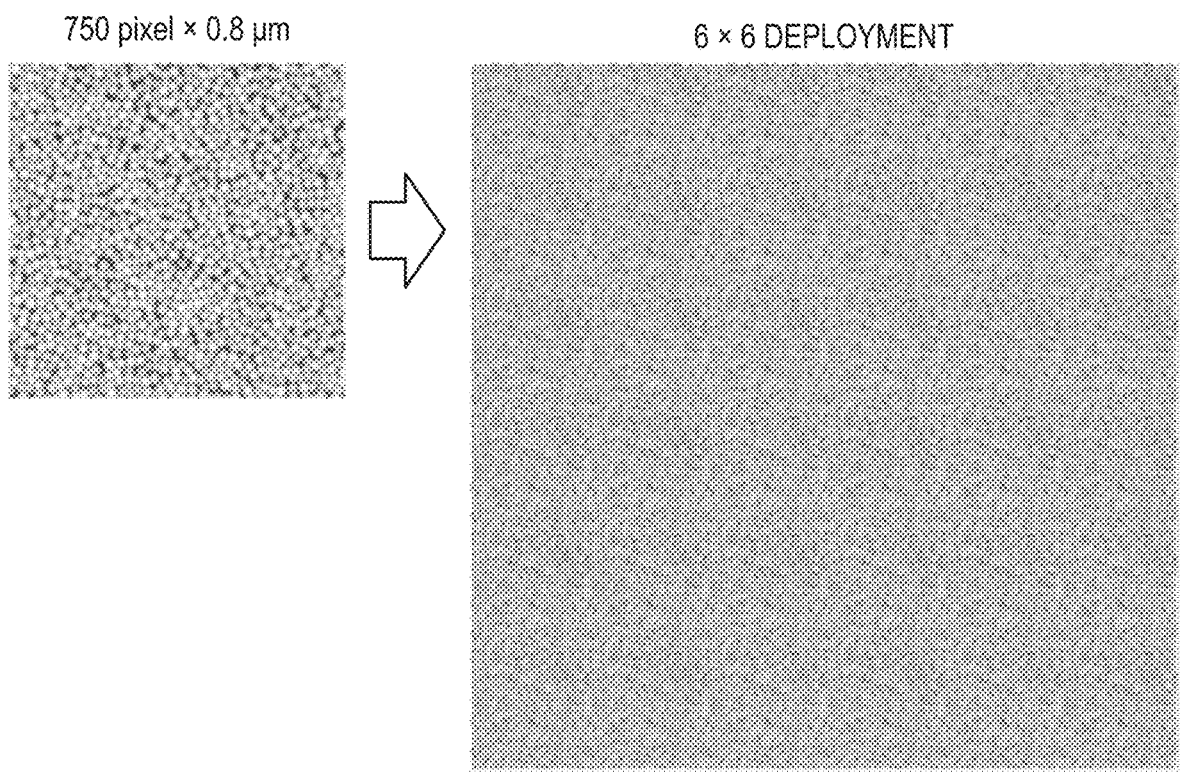
FIG. 16 is an explanatory diagram showing an example of a result of confirming presence/absence of a macro pattern.
Figure 17:
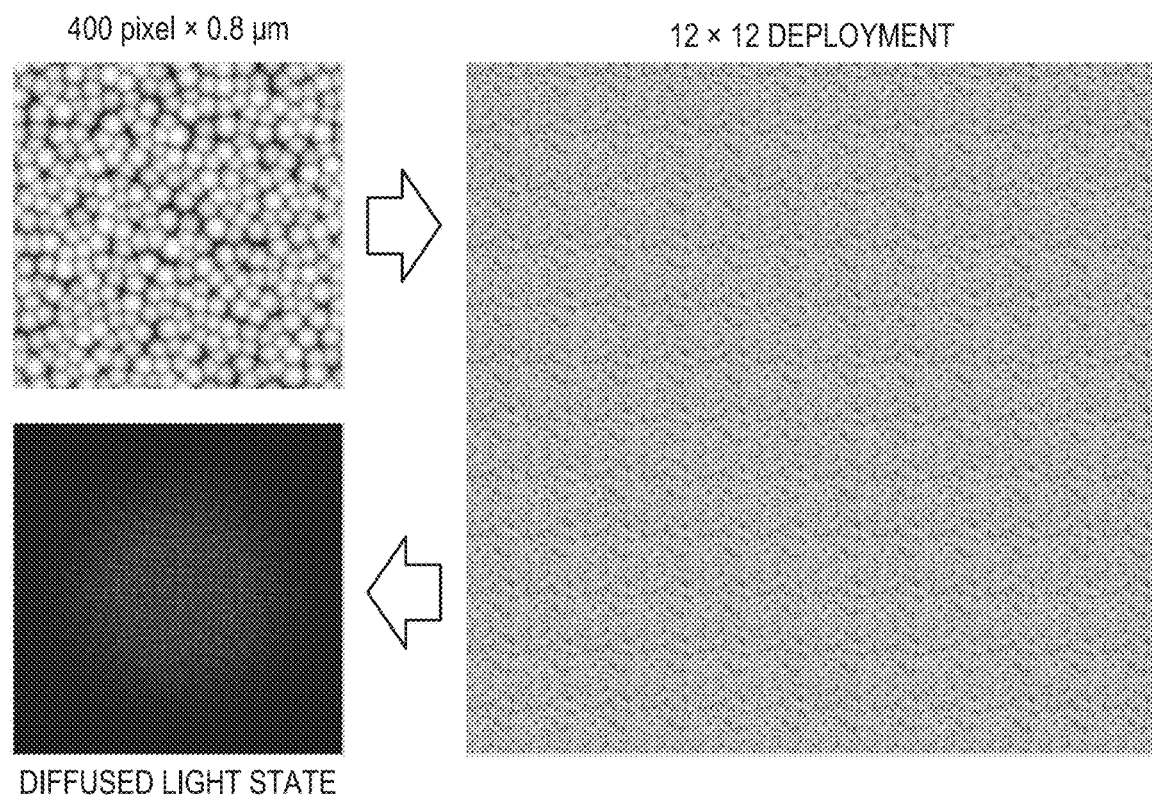
FIG. 17 is an explanatory diagram showing an example of a result of confirming presence/absence of a macro pattern.
Figure 18:
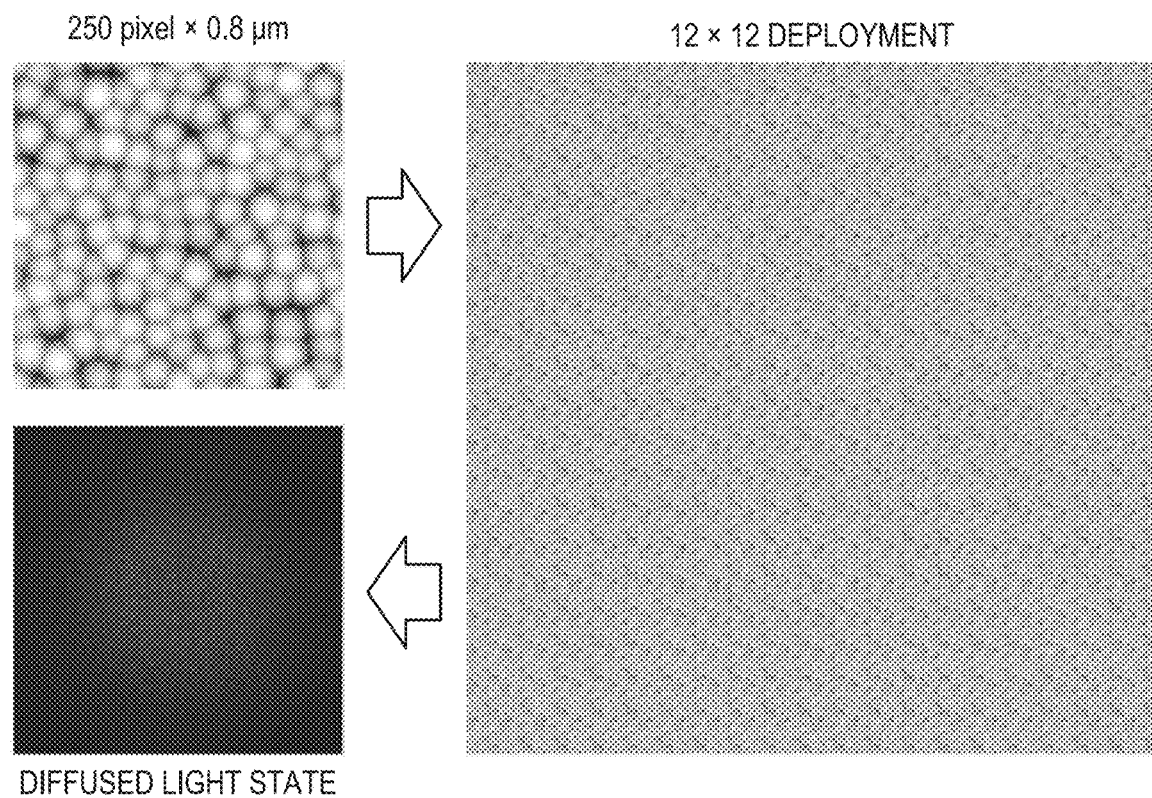
FIG. 18 is an explanatory diagram showing an example of a result of confirming presence/absence of a macro pattern.
Figure 19:
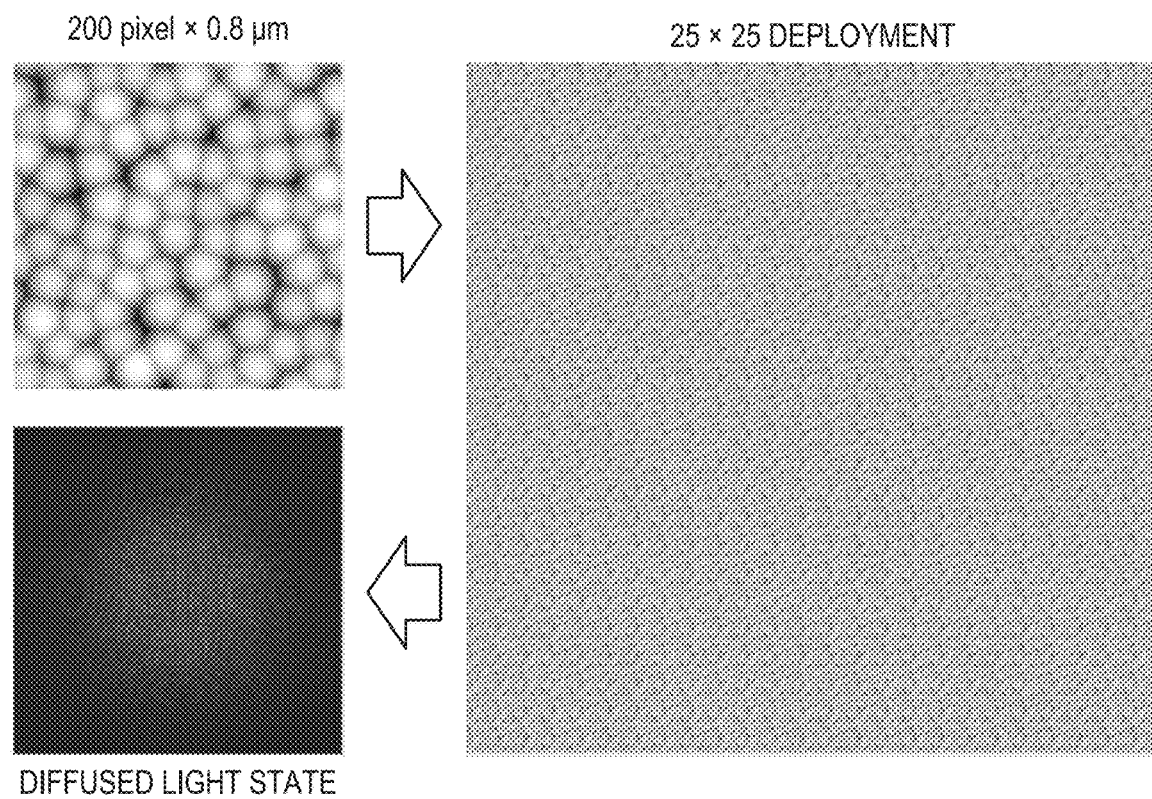
FIG. 19 is an explanatory diagram showing an example of a result of confirming presence/absence of a macro pattern.

Note that FIG. 13 shows a result obtained when the number of dots P=5000 pixels, and the surface shape of this unit cell 3, a captured image in a case where these unit cells 3 are located by 3×3=9, and a simulation result of a diffused light state of this optical body are shown together in the drawing. FIG. 14 shows a result obtained when the number of dots P=2000 pixels, and the surface shape of this unit cell 3 and a captured image in a case where these unit cells 3 are located by 2×2=4 are shown together in the drawing. FIG. 15 shows a result obtained when the number of dots P=1000 pixels, and the surface shape of this unit cell 3, a captured image in a case where these unit cells 3 are located by 5×5=25, and a simulation result of a diffused light state of this optical body are shown together in the drawing. FIG. 16 shows a result obtained when the number of dots P=750 pixels, and the surface shape of this unit cell 3 and a captured image in a case where these unit cells 3 are located by 6×6=36 are shown together in the drawing. FIG. 17 shows a result obtained when the number of dots P=400 pixels, and the surface shape of this unit cell 3, a captured image in a case where these unit cells 3 are located by 12×12=144, and a simulation result of a diffused light state of this optical body are shown together in the drawing. FIG. 18 shows a result obtained when the number of dots P=250 pixels, and the surface shape of this unit cell 3, a captured image in a case where these unit cells 3 are located by 12×12=144, and a simulation result of a diffused light state of this optical body are shown together in the drawing. FIG. 19 shows a result obtained when the number of dots P=200 pixels, and the surface shape of this unit cell 3, a captured image in a case where these unit cells 3 are located by 25×25=625, and a simulation result of a diffused light state of this optical body are shown together in the drawing. FIG. 20 shows a result obtained when the number of dots P=125 pixels, and the surface shape of this unit cell 3, a captured image in a case where these unit cells 3 are located by 40×40=1600, and a simulation result of a diffused light state of this optical body are shown together in the drawing.

As is apparent by comparing FIG. 13 to FIG. 20 to each other, it is understood that, as the number of pixels P on one side decreases in value, the size of the single lenses 21 that occupy the unit cell 3 relatively increases. Further, it is understood that a regular pattern does not occur in captured images in which the values of the number of pixels P on one side are 5000 pixels to 1000 pixels, whereas when the value of the number of pixels P on one side becomes less than or equal to 750 pixels, a regular pattern occurs in captured images. Furthermore, it can be confirmed that, when the value of the number of pixels P on one side becomes less than or equal to 250 pixels, diffracted light of macrocycle occurs in the simulation result of the diffused light state.

For such verification results, calculation of the size ratio of the dimension L of one side of the unit cell 3 to the aperture diameter DAVE results in the illustration in FIG. 12. Since a macro pattern was confirmed in the result obtained when P=750 pixels corresponding to the size ratio of 20, and a macro pattern was not confirmed in the result obtained when P=1000 pixels corresponding to the size ratio of 26.67, the inventors of the present application have obtained findings that occurrence of a macro pattern can be suppressed by setting the size ratio at more than or equal to 25.

In order to verify the findings, the unit cell 3 was produced with the reference aperture diameter D=250 μm, the reference radius of curvature R=200 μm, the perturbation amount δ=±5%, the minimum dot size $\Delta$=0.8 μm, and the size ratio of 25, and a captured image obtained in a case where the produced unit cells 3 were located by 5×5=25 was confirmed. An obtained result is shown in FIG. 21. As is also apparent from the captured image shown in FIG. 21 obtained in the case where 25 unit cells 3 were located, it is understood that occurrence of a macro pattern can be suppressed by setting the size ratio at more than or equal to 25 even in a case where the reference aperture diameter D is changed.

These results have caused the inventors of the present application to have confidence in the findings that, if an optical body whose ratio of the size of the unit cell 3 which is a non-periodic structure region to the average aperture diameter DAVE of the single lenses 21 in the unit cell 3 is more than or equal to 25 is produced, occurrence of a macro pattern can be suppressed. Note that the upper limit value of the size ratio is not particularly defined, but a larger upper limit value is more preferable.

<With Regard to Diffusion Properties of Optical Body>

Diffusion properties of the optical body 1 as described above in which the size ratio of the size of the unit cell 3 which is a non-periodic structure region to the average aperture diameter DAVE of the single lenses 21 in the unit cell 3 is more than or equal to 25 will be described with reference to FIG. 22A to FIG. 22C.

In the optical body 1 according to the present embodiment, desired diffusion properties can be achieved by appropriately controlling the reference aperture diameter D, the reference radius of curvature R, the perturbation amount δ, and the like of the single lens group 20 constituting the unit cell 3, or by introducing an aspherical shape. In more detail, as to the optical body 1 according to the present embodiment, by performing appropriate adjustments as described above, an optical body whose diffusion half angle (diffusion half width) is more than or equal to 20 degrees can also be produced, and an optical body whose diffusion half angle (diffusion half width) is less than or equal to 10 degrees can also be produced.

Here, by making extremely narrow band incident light as shown in FIG. 22A incident on the optical body 1 according to the present embodiment, diffusion properties having a diffusion half angle of more than or equal to 20 degrees can also be achieved as shown in FIG. 22B, and diffusion properties having a diffusion half angle of less than or equal to 10 degrees can also be achieved as shown in FIG. 22C. Note that the optical body 1 shown in FIG. 22B is an optical body including the unit cells 3 produced with the reference aperture diameter D=30 μm, the reference radius of curvature R=20 μm, the perturbation amount δ=5%, and the size ratio=26.7. The optical body 1 shown in FIG. 22C is an optical body including the unit cells 3 produced with the reference aperture diameter D=80 μm, the reference radius of curvature R=200 μm, the perturbation amount δ=10%, and the size ratio=50.

An optical body having a diffusion half angle (diffusion half width) of more than or equal to 20 degrees can be suitably utilized for the area of diffused light that humans can easily recognize visually, and can be utilized for various lighting devices to be utilized for spotlighting, base lighting, and the like, various special lightings, various screens such as an intermediate screen and a final screen, and the like.

On the other hand, an optical body having a diffusion half angle (diffusion half width) of less than or equal to 10 degrees can be suitably utilized for the area of controlling diffusion of light-source light in an optical device, and the like, and can be utilized for light distribution control of an LED light source device, light distribution control of a laser light source device, incident light distribution control for various light valves, and the like.

The optical body according to the present embodiment has been described above in detail with reference to FIG. 1 to FIG. 22C.

(With Regard to Example of Method of Producing Optical Body)

Figure 23:
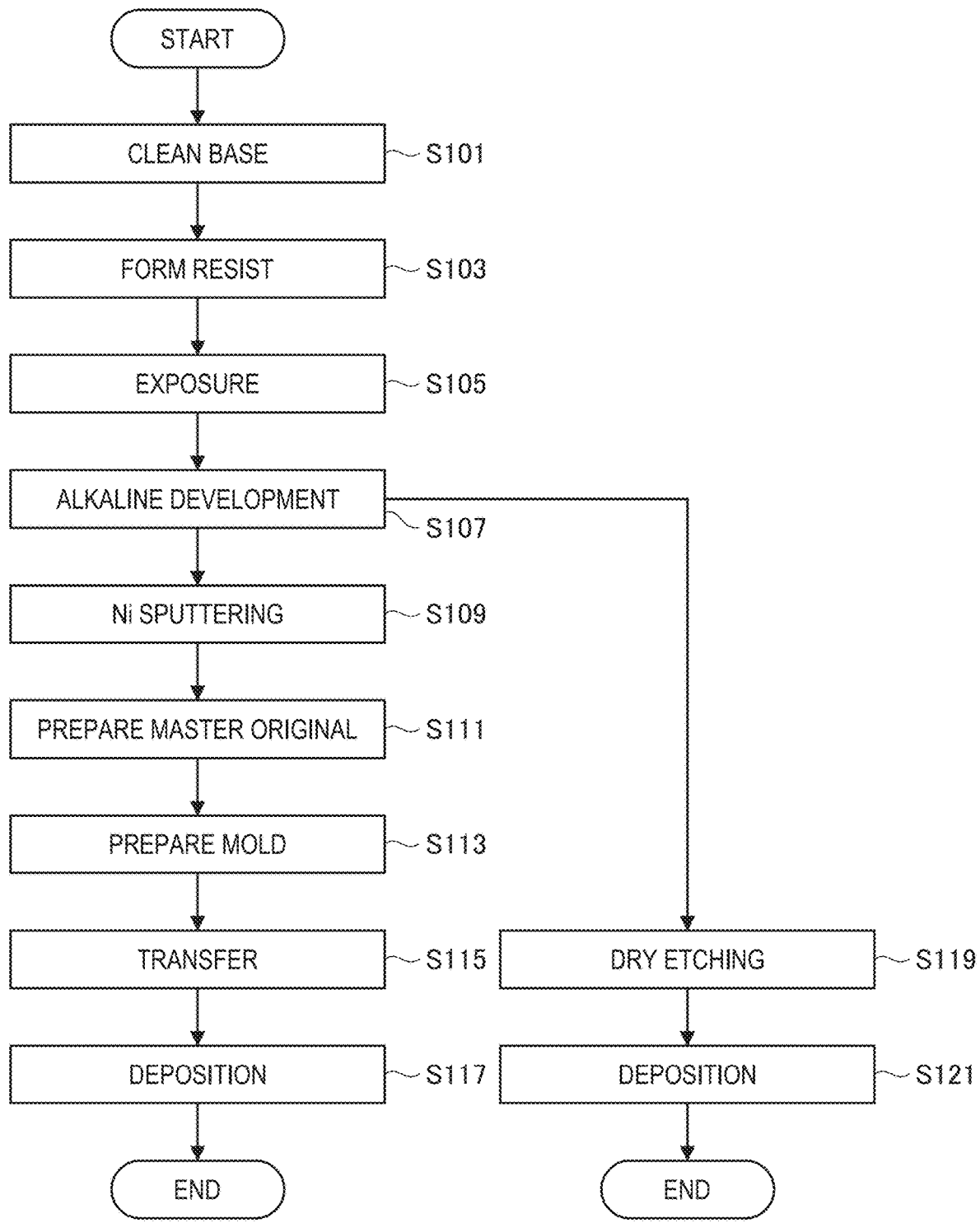
FIG. 23 is a flowchart showing an example of a flow of a method of producing the optical body according to the embodiment.

Hereinafter, an example of a method of producing the optical body 1 according to an embodiment of the present invention will be briefly described with reference to FIG. 23. FIG. 23 is a flowchart showing an example of a flow of the method of producing the optical body according to the present embodiment.

In the method of producing the optical body according to the present embodiment, cleaning of a base is carried out first (step S101). This base may be a roll-like base such as a glass roll, or may be a planar base such as a glass wafer, for example.

Next, a resist (such as a resist in which a metal oxide is used or a resist in which an organic substance is used, for example) is formed on the base after cleaning (step S103). Processing of forming this resist is achieved by application processing or dipping for a roll-like base, and achieved by various kinds of coating processing for a planar base.

Thereafter, exposure processing is carried out on the base on which the resist has been formed (step S105). In this exposure processing, it is important to design the unit cell 3 such that the size ratio is more than or equal to 25 as described earlier. To this exposure processing, publicly-known various exposure methods, such as exposure through use of a gray scale mask or the like (including multi-exposure performed by overlaying a plurality of gray scale masks), gray scale exposure on a flat plate or a rolled plate, or laser exposure through use of picosecond pulsed laser, femtosecond pulsed laser, or the like, can be applied as appropriate.

Thereafter, by subjecting the base after exposure to alkaline development (step S107) and publicly-known sputtering processing such as Ni sputtering (step S109), a master original (such as a glass master or a metal master, for example) when producing the optical body 1 according to the present embodiment is completed (step S111). Thereafter, a mold such as a soft mold is prepared using the completed master original (step S113).

Next, the optical body 1 according to the present embodiment is produced by carrying out transfer processing on a substrate glass, a substrate film, or the like utilizing the produced mold (step S115) and depositing a protective film or the like according to necessity (step S117).

On the other hand, in a case of subjecting the glass substrate to direct processing, the optical body 1 according to the present embodiment is produced by carrying out dry etching processing through use of a publicly-known compound such as $CF_4$ (step S119) subsequently to the alkaline development processing in step S107, and thereafter depositing a protective film or the like according to necessity (step S121).

Note that the flow of the production method shown in FIG. 23 is merely an example, and the method of producing the optical body according to the present embodiment is not limited to the example shown in FIG. 23.

Application Examples of Optical Body

Next, application examples of the optical body 1 according to the present embodiment will be briefly described.

The optical body 1 as described above can be suitably applied to a diffuser plate to be used for diffusing light. That is, a diffuser plate having desired diffusion properties can be achieved by providing the optical body as described above on at least either the front surface or the rear surface of a predetermined optical base material.

Further, the diffuser plate having the optical body 1 according to the present embodiment as described above can be mounted as appropriate in a device that needs to diffuse light to achieve its function. Examples of the device that needs to diffuse light to achieve the function can include a display device such as various displays and a projection device such as a projector.

Further, the diffuser plate having the optical body 1 according to the present embodiment can also be applied to a backlight of a liquid crystal display device, and can also be used for optical shaping application. Furthermore, the diffuser plate having the optical body 1 according to the present embodiment can also be applied to various lighting devices.

Note that the device that needs to diffuse light to achieve the function is not limited to the above examples, but the diffuser plate having the optical body 1 according to the present embodiment can also be applied to any other publicly-known devices that utilize diffusion of light.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

REFERENCE SIGNS LIST 1 optical body
10 transparent base material
20 single lens group
21 single lens

The invention claimed is:

1. An optical body including a single non-periodic structure region or a collection of a plurality of non-periodic structure regions, the non-periodic structure region being composed of a single lens group including a plurality of single lenses, wherein
in the non-periodic structure region, a located state of the single lens group is non-periodic as a whole, and
a ratio of a size of the non-periodic structure region to an average aperture diameter of the single lenses in the non-periodic structure region is more than or equal to 25, wherein
in the non-periodic structure region, a changing rate, from a reference, of at least one of a located pitch of the single lens group, an aperture diameter of the single lenses, a radius of curvature of the single lenses, and a shape of the single lenses is more than or equal to 5%.

2. The optical body according to claim 1, wherein
in the non-periodic structure region, at least one of a located pitch of the single lens group, an aperture diameter of the single lenses, a radius of curvature of the single lenses, and a shape of the single lenses changes.

3. The optical body according to claim 1, wherein
a surface shape of the single lenses in the non-periodic structure region is a spherical shape in which a reference radius of curvature R [μm] and a reference aperture diameter D [μm] satisfy a relation of R≥(D/2) or an aspherical shape.

4. The optical body according to claim 1, wherein
a reference aperture diameter D of the single lenses in the non-periodic structure region is more than or equal to 30 μm and less than or equal to 300 μm.

5. The optical body according to claim 1, wherein
the optical body is an optical body obtained by repeatedly locating the non-periodic structure regions identical to each other.

6. The optical body according to claim 1, wherein
the optical body is an optical body obtained by repeatedly locating the non-periodic structure regions different from each other.

7. The optical body according to claim 1, wherein
a half width at half maximum of a diffusion angle of diffused light transmitted through the optical body is more than or equal to 20 degrees.

8. A diffuser plate comprising:
the optical body as defined in claim 1 on a surface.

9. A display device comprising:
a diffuser plate having the optical body as defined in claim 1.

10. A projection device comprising:
a diffuser plate having the optical body as defined in claim 1.

11. A lighting device comprising:
a diffuser plate having the optical body as defined in claim 1.

* * * * *